United States Patent
Bitra et al.

(10) Patent No.: US 10,278,016 B2
(45) Date of Patent: *Apr. 30, 2019

(54) SYSTEMS AND METHODS FOR POSITION ESTIMATION USING PROXIMITY DEVICES

(71) Applicant: QUALCOMM Incorporated, San Diego, CA (US)

(72) Inventors: Suresh Kumar Bitra, Mangalagiri (IN); Ashwin Kumar Donthula, Hyderabad (IN); Stephen William Edge, Escondido, CA (US); Arun Kumar Sharma Tandra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,511

(22) Filed: Feb. 3, 2017

(65) Prior Publication Data
US 2018/0227702 A1   Aug. 9, 2018

(51) Int. Cl.
*H04W 4/02* (2018.01)
*H04W 64/00* (2009.01)
(Continued)

(52) U.S. Cl.
CPC ........... *H04W 4/023* (2013.01); *H04W 64/00* (2013.01); *G01S 5/0236* (2013.01); *H04W 84/042* (2013.01)

(58) Field of Classification Search
CPC ... H04W 4/023; H04W 84/042; H04W 64/00; G01S 5/0236
(Continued)

(56) References Cited

U.S. PATENT DOCUMENTS 8,483,705 B1 * 7/2013 Cope ............... H04W 4/043
370/352
8,750,901 B1 * 6/2014 Gupta .............. G06Q 20/3223
455/456.1
(Continued)

FOREIGN PATENT DOCUMENTS

WO    2012141808 A1   10/2012

OTHER PUBLICATIONS

Krumm J., et al., "The NearMe Wireless Proximity Server", UbiComp 2004, The Sixth International Conference on Ubiquitous Computing, Nottingham, England, vol. 3205, Sep. 7-10, 2004, pp. 283-300.
(Continued)

*Primary Examiner* — Mong-Thuy T Tran
(74) *Attorney, Agent, or Firm* — Kilpatrick Townsend & Stockton

(57) ABSTRACT

Techniques are provided which may be implemented using various methods and/or apparatuses for locating a User Equipment (UE) using one or more proximity devices (PDs) nearby to the UE. One of the provided exemplary techniques includes initiating, by the UE, a request for a location of the UE; sending, by the UE to a location server, a first message comprising a first information for at least one PD in communication with the UE; receiving, by the UE from the location server, a second message comprising a second information for the at least one PD; sending, by the UE to the at least one PD, the second information; receiving, by the UE from the at least one PD, a third information; and obtaining, by the UE, the location of the UE based on the third information.

22 Claims, 11 Drawing Sheets

(51) Int. Cl.
*H04W 84/04* (2009.01)
*G01S 5/02* (2010.01)

(58) Field of Classification Search
USPC .................................. 455/456.1–456.6, 457
See application file for complete search history.

(56) References Cited

U.S. PATENT DOCUMENTS

| | | | | |
|---|---|---|---|---|
| 10,172,031 B2* | 1/2019 | Xie | ............ | H04W 64/00 |
| 2011/0165892 A1* | 7/2011 | Ristich | ............ | H04W 64/00 |
| | | | | 455/456.2 |
| 2011/0306323 A1 | 12/2011 | Do et al. | | |
| 2012/0258733 A1* | 10/2012 | Fischer | ............ | H04W 4/20 |
| | | | | 455/456.1 |
| 2013/0084882 A1 | 4/2013 | Khorashadi et al. | | |
| 2013/0316727 A1* | 11/2013 | Edge | ............ | H04W 4/02 |
| | | | | 455/456.1 |
| 2013/0337831 A1* | 12/2013 | Edge | ............ | H04W 4/02 |
| | | | | 455/456.1 |
| 2014/0094195 A1* | 4/2014 | Luo | ............ | H04W 4/12 |
| | | | | 455/456.3 |
| 2014/0213294 A1* | 7/2014 | Marti | ............ | G01S 5/0252 |
| | | | | 455/456.2 |
| 2014/0357198 A1* | 12/2014 | Ye | ............ | H04W 4/02 |
| | | | | 455/73 |
| 2015/0119068 A1* | 4/2015 | Kudekar | ............ | H04W 4/043 |
| | | | | 455/456.1 |
| 2015/0133173 A1 | 5/2015 | Edge et al. | | |
| 2015/0148055 A1* | 5/2015 | Alles | ............ | G01S 5/0036 |
| | | | | 455/456.1 |
| 2015/0172858 A1* | 6/2015 | Choi | ............ | H04W 4/02 |
| | | | | 455/456.1 |
| 2015/0201305 A1* | 7/2015 | Edge | ............ | H04W 4/021 |
| | | | | 455/456.3 |
| 2015/0350850 A1* | 12/2015 | Edge | ............ | H04W 4/04 |
| | | | | 455/456.1 |
| 2016/0044504 A1* | 2/2016 | Edge | ............ | H04W 64/00 |
| | | | | 455/456.3 |
| 2016/0127875 A1* | 5/2016 | Zampini, II | ............ | H04W 4/043 |
| | | | | 370/311 |
| 2016/0227370 A1 | 8/2016 | Gunnarsson et al. | | |
| 2016/0227371 A1 | 8/2016 | Wang et al. | | |
| 2016/0242000 A1* | 8/2016 | Venkatraman | ............ | H04W 4/028 |
| 2016/0269860 A1 | 9/2016 | Weizman et al. | | |
| 2016/0286009 A1* | 9/2016 | Edge | ............ | H04L 69/06 |
| 2016/0330605 A1* | 11/2016 | Zhu | ............ | H04W 4/023 |
| 2016/0360354 A1* | 12/2016 | Rhee | ............ | H04W 4/02 |

OTHER PUBLICATIONS

Co-pending U.S. Appl. No. 15/424,524, filed Feb. 3, 2017.
"3rd Generation Partnership Project; Technical Specification Group Radio Access Network; Study on indoor positioning enhancements for UTRA and L TE (Release 13)", 3GPP Standard; Technical Report; 3GPP TR 37.857, 3rd Generation Partnership Project (3GPP), vol. RAN WG1, No. V13.1.0, Dec. 7, 2015 (Dec. 7, 2015), XP051294349, pp. 1-82.
Ericsson: "Text Proposal and Discussion on Further Enhancements to WiFi/BT Based Positioning", 3GPP Draft; R1-153746, 3rd Generation Partnership Project (3GPP), vol. RAN WG1, No. Beijing, China; Aug. 24, 2015-Aug. 28, 2015, Aug. 15, 2015 (Aug. 15, 2015), XP050993309, pp. 1-4.
International Search Report and Written Opinion—PCT/US2017/062387—ISA/EPO—Apr. 19, 2018.

* cited by examiner

SYSTEMS AND METHODS FOR POSITION ESTIMATION USING PROXIMITY DEVICES

BACKGROUND

The position of a user equipment (UE), such as a mobile phone, tablet computer, personal media player, or other wireless electronic device can be estimated based on wireless signals transmitted by wireless access points (APs) and/or base stations (BSs) and received by the UE. If the locations of the APs and/or BSs are known (e.g. by the UE or a separate location server), the UE or the location server can estimate the position of the UE by using measurements (e.g. timing or range measurements) obtained by the UE of the wireless signals.

In some scenarios however, the UE may not be within effective range of a sufficient number of APs and/or BSs to enable an accurate position estimation. For example, this may occur in buildings with obstructing features, such as thick concrete walls and floors, that limit the effective signal coverage range of APs and BSs. In other scenarios, the UE may not have effective positioning capabilities and resources, such as a lack of inertial sensors, lack of support for positioning based on signals from APs and BSs, or lack of sufficient battery power to perform positioning on a frequent basis. Exemplary embodiments of the disclosure address these problems, both individually and collectively.

SUMMARY

Certain embodiments are described for obtaining by a UE, location estimation of the UE via proximity devices in communication with the UE. An exemplary embodiment includes a method for locating a User Equipment (UE) comprising initiating, by the UE, a request for a location of the UE; sending, by the UE to a location server, a first message comprising a first information for at least one proximity device (PD) in communication with the UE; receiving, by the UE from the location server, a second message comprising a second information for the at least one PD; sending, by the UE to the at least one PD, the second information; receiving, by the UE from the at least one PD, a third information; and obtaining, by the UE, the location of the UE based on the third information.

Another exemplary embodiment includes a User Equipment (UE) apparatus having a wireless communication interface, a memory, and a processing unit communicatively coupled with the wireless communication interface and the memory, the processing unit configured to cause the UE to: initiate a request for a location of the UE; send to a location server, a first message comprising a first information for at least one proximity device (PD) in communication with the UE; receive from the location server, a second message comprising a second information for the at least one PD; send to the at least one PD, the second information; receive from the at least one PD, a third information; and obtain the location of the UE based on the third information.

Another exemplary embodiment includes a User Equipment (UE) apparatus having: a means for initiating, by the UE, a request for a location of the UE; means for sending, by the UE to a location server, a first message comprising a first information for at least one proximity device (PD) in communication with the UE; means for receiving, by the UE from the location server, a second message comprising a second information for the at least one PD; means for sending, by the UE to the at least one PD, the second information; means for receiving, by the UE from the at least one PD, a third information; and means for obtaining, by the UE, the location of the UE based on the third information.

Another exemplary embodiment includes a non-transitory machine-readable medium having instructions embedded thereon, the instructions comprising computer code for: initiating, by a User Equipment (UE), a request for a location of the UE; sending, by the UE to a location server, a first message comprising a first information for at least one proximity device (PD) in communication with the UE; receiving, by the UE from the location server, a second message comprising a second information for the at least one PD; sending, by the UE to the at least one PD, the second information; receiving, by the UE from the at least one PD, a third information; and obtaining, by the UE, the location of the UE based on the third information.

Another exemplary embodiment includes a method comprising receiving, at a location server from a User Equipment (UE), a first message comprising a first information for at least one proximity device (PD) in communication with the UE; determining, by the location server, a second information for the at least one PD; sending, by the location server to the UE, a second message comprising the second information; receiving, by location server from the UE in response to the sent second message, a third message comprising a third information; determining, by the location server, a location of the UE based on the third information; and sending, by the location server to the UE, the determined location of the UE.

Another exemplary embodiment includes a location server apparatus comprising a wireless communication interface; a memory; and a processing unit communicatively coupled with the wireless communication interface and the memory, the processing unit configured to cause the location server to: receive, at a location server from a User Equipment (UE), a first message comprising a first information for at least one proximity device (PD) in communication with the UE; determine, by the location server, a second information for the at least one PD; send, by the location server to the UE, a second message comprising the second information; receive, by location server from the UE in response to the sent second message, a third message comprising a third information; determine, by the location server, a location of the UE based on the third information; and send, by the location server to the UE, the determined location of the UE.

Another exemplary embodiment includes a location server apparatus comprising means for receiving, at a location server from a User Equipment (UE), a first message comprising a first information for at least one proximity device (PD) in communication with the UE; means for determining, by the location server, a second information for the at least one PD; means for sending, by the location server to the UE, a second message comprising the second information; means for receiving, by location server from the UE in response to the sent second message, a third message comprising a third information; means for determining, by the location server, a location of the UE based on the third information; and means for sending, by the location server to the UE, the determined location of the UE.

Another exemplary embodiment includes a non-transitory machine-readable medium having instructions embedded thereon, the instructions comprising computer code for receiving, at a location server from a User Equipment (UE), a first message comprising a first information for at least one proximity device (PD) in communication with the UE; determining, by the location server, a second information for the at least one PD; sending, by the location server to the UE, a second message comprising the second information; receiving, by location server from the UE in response to the sent second message, a third message comprising a third information; determining, by the location server, a location of the UE based on the third information; and sending, by the location server to the UE, the determined location of the UE.

Another exemplary embodiment includes a method at a User Equipment (UE) for locating the UE comprising receiving, at the UE from a location server, a request for a location of the UE; sending, by the UE to the location server, a first message comprising a first information for at least one proximity device (PD) in communication with the UE; receiving, by the UE from the location server, a second message comprising a second information for the at least one PD; sending, by the UE to the at least one PD, the second information; receiving, by the UE from the at least one PD, a third information; determining, by the UE, a location information for the UE based on the third information; and sending, by the UE to the location server, a third message comprising the determined location information for the UE.

Another exemplary embodiment includes a user equipment (UE) apparatus comprising a wireless communication interface; a memory; and a processing unit communicatively coupled with the wireless communication interface and the memory, the processing unit configured to cause the UE to: receiving from a location server, a request for a location of the UE; send to the location server, a first message comprising a first information for at least one proximity device (PD) in communication with the UE; receive from the location server, a second message comprising a second information for the at least one PD; send to the at least one PD, the second information; receive from the at least one PD, a third information; determine a location information for the UE based on the third information; and send to the location server, a third message comprising the determined location information for the UE.

Another exemplary embodiment includes a user equipment (UE) apparatus comprising means for receiving from a location server, a request for a location of the UE; means for sending to the location server, a first message comprising a first information for at least one proximity device (PD) in communication with the UE; means for receiving from the location server, a second message comprising a second information for the at least one PD; means for sending to the at least one PD, the second information; means for receiving from the at least one PD, a third information; means for determining a location information for the UE based on the third information; and means for sending the location server, a third message comprising the determined location information for the UE.

Another exemplary embodiment includes a non-transitory machine-readable medium having instructions embedded thereon, the instructions comprising computer code for: receiving, at a user equipment (UE) from a location server, a request for a location of the UE; sending, by the UE to the location server, a first message comprising a first information for at least one proximity device (PD) in communication with the UE; receiving, by the UE from the location server, a second message comprising a second information for the at least one PD; sending, by the UE to the at least one PD, the second information; receiving, by the UE from the at least one PD, a third information; determining, by the UE, a location information for the UE based on the third information; and sending, by the UE to the location server, a third message comprising the determined location information for the UE.

Another exemplary embodiment includes a method comprising sending, from a location server to a User Equipment (UE), a request for a location of the UE; receiving, at a location server from the UE, a first message comprising a first information for at least one proximity device (PD) in communication with the UE; determining, by the location server, a second information for the at least one PD; sending, by the location server to the UE, a second message comprising the second information; and receiving, by location server from the UE in response to the sent second message, a third message comprising a third information; and determining, by the location server, the location of the UE based on the third information.

Another exemplary embodiment includes a location server comprising a wireless communication interface; a memory; and a processing unit communicatively coupled with the wireless communication interface and the memory, the processing unit configured to cause the location server to: send, from a location server to a User Equipment (UE), a request for a location of the UE; receive, at a location server from the UE, a first message comprising a first information for at least one proximity device (PD) in communication with the UE; determine, by the location server, a second information for the at least one PD; send, by the location server to the UE, a second message comprising the second information; and receive, by location server from the UE in response to the sent second message, a third message comprising a third information; and determine, by the location server, the location of the UE based on the third information.

Another exemplary embodiment includes a location server comprising means for receiving, at a location server from the UE, a first message comprising a first information for at least one proximity device (PD) in communication with the UE; means for determining, by the location server, a second information for the at least one PD; means for sending, by the location server to the UE, a second message comprising the second information; means for receiving, by location server from the UE in response to the sent second message, a third message comprising a third information; and means for determining, by the location server, a location of the UE based on the third information.

Another exemplary embodiment includes a non-transitory machine-readable medium having instructions embedded thereon, the instructions comprising computer code for: receiving, at a location server from the UE, a first message comprising a first information for at least one proximity device (PD) in communication with the UE; determining, by the location server, a second information for the at least one PD; sending, by the location server to the UE, a second message comprising the second information; receiving, by location server from the UE in response to the sent second message, a third message comprising a third information; and determining, by the location server, a location of the UE based on the third information.

Items and/or techniques described herein may provide one or more of the following capabilities, as well as other capabilities not mentioned. Techniques can provide for more effective method for obtaining by a UE, location estimation of the UE via proximity devices in communication with the UE. These techniques may also help prolong the battery life of the UE during use. These and other advantages and features are described in more detail in conjunction with the text below and attached figures.

BRIEF DESCRIPTION OF THE DRAWINGS

An understanding of the nature and advantages of various embodiments may be realized by reference to the following figures.

Figure 1:
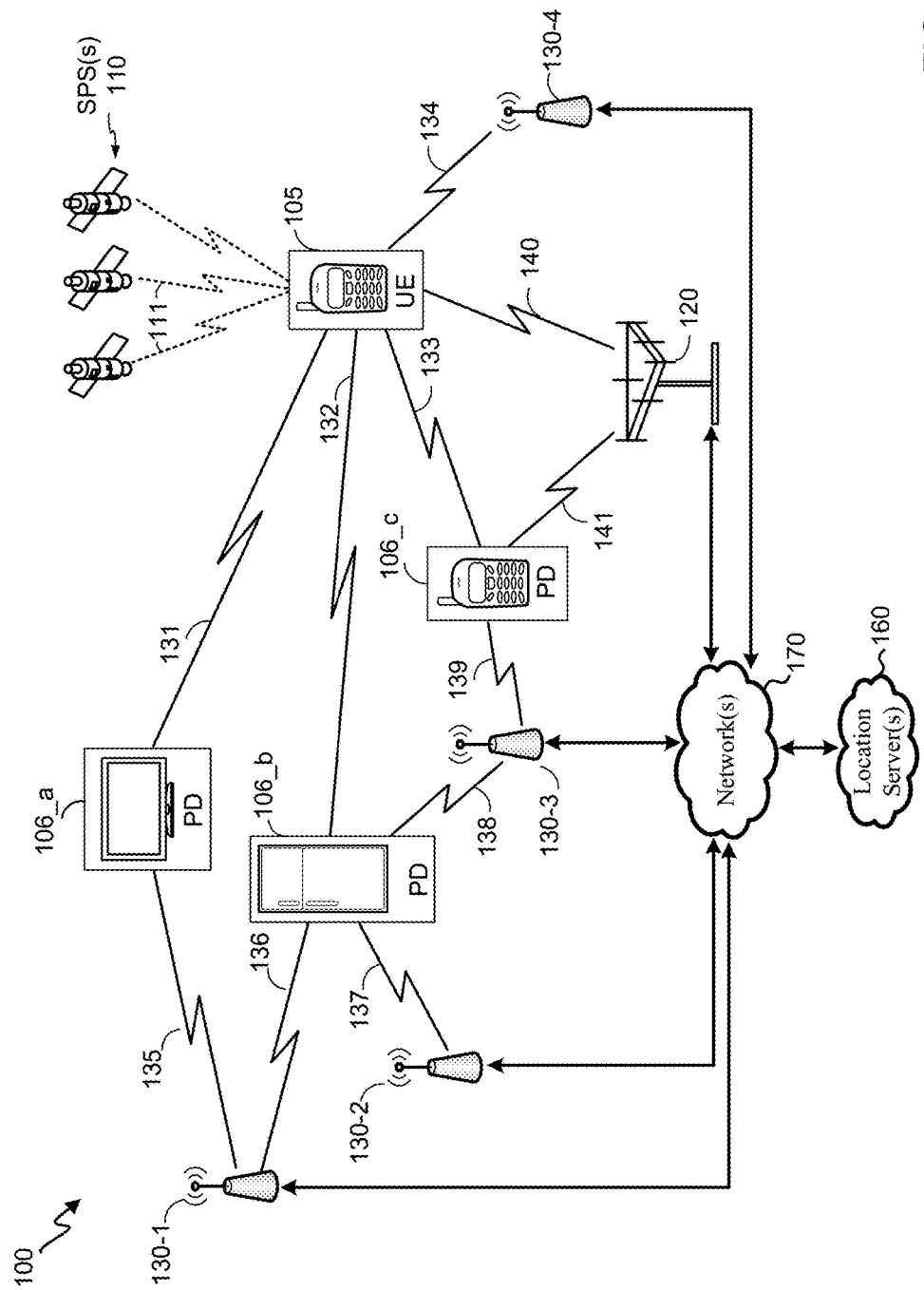
FIG. 1 illustrates an example environment in which various aspects of the disclosure can be implemented.

Elements, stages, steps and actions with the same reference label in different drawings may correspond to one another (e.g. may be similar or identical to one another). Further, some elements in the various drawings are labelled using a numeric prefix followed by an alphabetic or numeric suffix. Elements with the same numeric prefix but different suffices may be different instances of the same type of element. The numeric prefix without any suffix is then used herein to reference any element with this numeric prefix. For example, different instances 106_a, 106_b and 106_c of a proximity device are shown in FIG. 1. A reference to a proximity device 106 then refers to any of proximity devices 106_a, 106_b and 106_c.

DETAILED DESCRIPTION

The ensuing description provides exemplary embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments provided in the following description are illustrative only and are not intended to limit the scope of the present disclosure. Reference will now be made in detail to implementations of examples as illustrated in the accompanying drawings.

In the interest of clarity, not all of the routine features of the examples described herein are shown and described. It will, of course, be appreciated that in any such actual implementation, numerous implementation-specific details may nevertheless exist in order to achieve goals such as compliance with application- and business-related constraints, and that these specific goals can vary from one implementation to another.

FIG. 1 is a simplified illustration of a positioning system 100, according to one exemplary embodiment, which can implement the techniques described herein. As shown in FIG. 1, a User Equipment (UE) 105 and/or other components of the positioning system 100 can process measurements and/or other data points to determine the position of the UE 105. A UE may also be referred to as a mobile station, wireless terminal, mobile terminal, mobile device, wireless device, terminal or Secure User Plane Location (SUPL) Enabled Terminal (SET). The UE 105 may a mobile phone, smartphone, tablet, mobile gaming system, personal media player, notebook computer, laptop or other similar electronic device. The positioning system 100 can also include satellite positioning system(s) (SPS(s)) 110, base station(s) (BSs) 120, access point(s) (AP) 130, such as 130-1 to 130-4, location server(s) 160, and Network(s) 170, such as the Internet, a wireless wide area network (WWAN), a wireless local area network (WLAN), etc.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., millions, etc.) may be utilized in the positioning system 100. Similarly, the positioning system 100 may include many base station(s) 120 and/or a different number of AP(s) 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

As shown in FIG. 1, the base station(s) 120 is communicatively coupled via wireless signaling 140 to the UE 105 and via wireless signaling 141 to at least one Proximity Device (PD) 106, such as PD 106_c, and is communicatively coupled (e.g. via a wired or wireless backhaul link) to at least one network (e.g., a cellular WWAN, IEEE 802.11 WLAN, etc.) in Network(s) 170. Base station(s) 120 may support wireless access according to standards defined by the Third Generation Partnership Project (3GPP) such as wireless access for Long Term Evolution (LTE) which may be a Fourth Generation (4G) technology, Wideband Code Division Multiple Access (W-CDMA) which may be a 3G technology, Global System for Mobile Communications (GSM) which may be a 2G technology, or a future 5G radio access type.

Network(s) 170 may be communicatively coupled with the location server(s) 160. Location server(s) 160 may comprise or include an Enhanced Serving Mobile Location Center (E-SMLC) as defined by 3GPP to support location of a UE with 4G LTE access, and/or a SUPL Location Platform (SLP) as defined by the Open Mobile Alliance (OMA) to support location of a UE with different types of WWAN and WLAN access.

As shown in FIG. 1, there may be a plurality of AP(s) 130, such as AP 130-1 through 130-4, which may be in one-way or two-way communication with the one or more of the PD(s) 106 via wireless signaling 135-139. In addition, some of the AP(s) 130, such as AP 130-4, may be detected by and/or in communication with the UE 105 in the provided exemplary illustration. Additionally or alternatively, the UE 105 may be able to establish communication links with different AP(s) 130 at different times, such as based on the movement of the UE 105. APs 130 may support wireless communication and wireless signaling according to the IEEE 802.11 family of standards, the Bluetooth® family of standards of other short range wireless standards (e.g. such as Near Field Communication (NFC)).

Generally, a network 170, such as a WWAN, can utilize mobile telecommunication cellular network and/or other technology to enable the UE 105 to transmit and receive data and/or other media types (e.g. voice or video) over a large geographical region. The position of the UE 105 in such a network can be determined using various means. The means may include SPS measurements obtained by UE 105 of signals 111 received from one more space vehicles (SVs) in one or more SPSs 110, such as an SPS 110 corresponding to GPS, Glonass or Galileo. The SPS measurements for any SV in an SPS 110 may comprise measurements of a pseudo-range, code phase and/or a carrier phase. The SPS measurements obtained by the UE 105 may be used to determine a location estimate for the UE 105 by the UE 105 or by a location server 160 if UE 105 send the SPS measurements to the location server 160 (e.g. via base station 120 and Network(s) 170). In the case of location determination by the UE 105, a location server 160 may send assistance data to the UE 105 (e.g. if first requested by the UE 105) to help the UE 105 determine the location. For example, the assistance data may include ephemeris, almanac and/or timing data for SVs visible to the UE 105 in one or more SPSs 110. The assistance data may also or instead include data to assist UE 105 to acquire and measure signals 111 from SVs in one or more SPSs 110—e.g. may include an expected Doppler shift and/or an expected code phase for each of one more SVs. Positioning of UE 105 by UE 105 using SPS signal measurements and without any assistance data may be referred to as a standalone Global Navigation Satellite System (GNSS) position method; positioning of the UE 105 by a location server 160 with assistance data sent to the UE 105 to assist measurement of SPS 110 signals may be referred to as an Assisted GNSS (A-GNSS) or UE assisted A-GNSS position method; and positioning of the UE 105 by the UE 105 using SPS measurements and with assistance data sent to the UE 105 may be referred to as an A-GNSS or a UE based A-GNSS position method.

The position of the UE 105 in a network 170 may also be determined using terrestrial measurements by the UE 105 of signals 140 received from base station(s) 120 antennas (e.g., cell towers) and/or signals 134 received from AP(s) 130. Such terrestrial measurements may include measurements of: (i) the round trip signal propagation time (RTT) between the UE 105 and a BS 120 or AP 130 (e.g. which may enable determination of a range between the UE 105 and a BS 120 or AP 130); (ii) measurements of a received signal strength indication (RSSI), signal to noise ratio (S/N), time of arrival (TOA), angle of arrival (AOA), reference signal received power (RSRP) and/or reference signal received quality (RSRQ) for a signal received by the UE 105 from a BS 120 or AP 130; and/or (iii) measurements of a reference signal time difference (RSTD) or observed time difference (OTD) between a pair of signals received by the UE 105 from two BSs 120 or two APs 130. Measurements for (i) and (ii) may be associated with an Enhanced Cell ID (ECID) position method in the case of measurements of signals from BS(s) 120 or a Wi-Fi, WLAN and/or Short Range Node (SRN) position method in the case of measurements of signals from AP(s) 130. Measurements for (iii) may be associated with an Observed Time Difference Of Arrival (OTDOA) position method. The terrestrial measurements (also referred to herein as terrestrial location measurements) obtained by the UE 105 may be similarly used to determine a location estimate for the UE 105 by the UE 105 or by a location server 160 if the UE 105 sends the terrestrial measurements to the location server 160 (e.g. via base station 120 and Network(s) 170). In the case of location determination by the UE 105, a location server 160 may also send assistance data to the UE 105 (e.g. if first requested by the UE 105) to help the UE 105 determine the location. In this case, the assistance data may comprise base station almanac data (BSA) that may include location coordinates, transmission timing, transmission power levels and/or other characteristics of AP(s) 130 and/or base station(s) 120. The assistance data may also or instead include data to assist the UE 105 to acquire and measure signals 134 from AP(s) 130 and/or signals 140 from BS(s) 120—e.g. may include information concerning signal frequencies, signal coding and/or signal timing.

The position of the UE 105 in a network 170 may further be determined using other methods such as hybrid combination of SPS measurements and terrestrial measurements and/or using measurements obtained by inertial and/or other sensors attached or connected to the UE 105 (e.g. gyroscopes, accelerometers, compass, barometer). The location determination by the UE 105 or a by location server 160 based on SPS measurements, terrestrial measurements and/or sensor measurements may employ known techniques such as triangulation, trilateration, multilateration, dead reckoning etc. The location determination of the UE 105 may also employ a control plane solution or a user plane solution. In a control plane solution, signaling between the UE 105 and a location server 160 is transferred using signaling interfaces and protocols in Network(s) 170. In a user plane solution, signaling between the UE 105 and a location server 160 is transferred as data from the perspective of Network(s) 170—e.g. using the Internet Protocol (IP) or Transmission Control Protocol (TCP) with IP (TCP/IP).

A location estimate may be referred to by other names such as a position estimate, location, position, position fix or fix. A location estimate may be geodetic and comprise coordinates (e.g. latitude, longitude and possibly altitude) or may be civic and comprise a street address, postal address or some other verbal description of a location. A location estimate may further be defined relative to some other known location or defined in absolute terms (e.g. using latitude, longitude and possibly altitude). A location estimate may include an expected error (e.g. by including an area or volume within which the location is expected to be included with some specified or default level of confidence). The position determination of a the UE 105 has become increasingly important with the use of positioning applications by and for UEs (e.g. for personal navigation, direction finding and asset and person tracking), regulatory requirements for locating mobile devices (e.g., for an emergency call), and the like.

Depending on where the UE 105 may be located, such as in a building with obstructing walls and floors, performing an accurate or efficient position determination via measurements by the UE 105 of signaling 111 received from space vehicles (SVs) in a satellite positioning system (SPS) 110, signaling 140 received from base station(s) 120 and/or signaling 134 received from AP(s) 130 may not always be possible or reliable due to attenuation and/or reflection of the signaling by floors, walls and/or other obstructions. In addition, there may not be sufficient AP(s) 130 and/or sufficient base station(s) 120 that are known to or in effective communication range of the UE 105 to enable the UE 105 or a location server 160 to accurately or reliably perform position determination.

The UE 105 may then seek assistance in determining the position of the UE 105 using one or more nearby PD(s) 106, such as PD 106_a, 106_b and 106_c in communication with the UE 105. For example, if each of PDs 106_a, 106_b and 106_c has a previously known location (e.g. obtained in the same or a similar manner to that described previously for the UE 105), a position for the UE 105 may be determined (e.g. by the UE 105 or by a location server 160) using measurements made by the UE 105 of signals received from PD(s) 106 and/or measurements made by PD(s) 106 of signals received from the UE 105 (and possibly of signals received from other PDs 106). For example, the UE 105 may make measurements (e.g. of RTT, RSSI, S/N, TOA, RSRP, RSRQ and/or AOA) for each of one or more of PDs 106_a, 106_b and 106_c based on signals 131, 132 and 133, respectively, received by the UE 105 from these PDs. Similarly, the UE 105 may make measurements (e.g. of RTT, RSSI, S/N, TOA, RSRP, RSRQ, AOA, RSTD and/or OTD) for one or more BSs 120 and/or APs 130. Further, one or more of PDs 106_a, 106_b and 106_c may make measurements (e.g. of RTT, RSSI, S/N, TOA, RSRP, RSRQ and/or AOA) for signals 131, 132 and 133, respectively, received from the UE 105. The measurements may be used by the UE 105, a PD 106 or location server 160 (e.g. if the measurements are sent to the location server 160 by the UE 105 and/or PD(s) 106) to obtain a location for the UE 105, based on the known locations for PD(s) 106, and using such techniques as triangulation, trilateration, multilateration, etc. The measurements may also or instead be used to determine location(s) for some PD(s) 106—e.g. if the location(s) for some other PD(s) 106 are already known. The locations determined for the UE 105 and/or for PD(s) 106 may be absolute or may be relative to the locations of certain PD(s) 106 and/or the UE 105. For example, when absolute locations for PD(s) 106 are not known in advance, the measurements may be used to obtain the location of each PD 106 relative to the UE 105 (and/or the location of the UE 105 relative to the location of each PD 106). The relative locations may be expressed by various means such as: (i) a range (distance), horizontal bearing (or azimuth) and possibly vertical inclination (or declination); (ii) relative X,Y and possible Z coordinates in some local coordinate system; or (iii) relative North-South, East-West and possibly up-down coordinates or distances.

The PD(s) 106 may be nearby to (i.e. within proximity of) the UE 105 (e.g. may be within 100 meters of the UE 105 in certain embodiments) and may include a variety of communication capable devices, such as a cellular mobile device 106_c, or Internet of Things (IoT) devices such as refrigerator 106_b, or television 106_a. The PD(s) 106 may belong to or otherwise be associated with the user of the UE 105. For example, PD(s) 106 could include one or more of: (i) wearable devices (e.g. a smartwatch or health monitor) attached to or worn by the user of the UE 105; (ii) smart appliances (e.g. TV, radio, home security system controller, refrigerator, HVAC system controller) that include a wireless communication capability and may be located in a home or office for the user of the UE 105; (iii) additional UEs belonging to the user of the UE 105; (iv) a home or office Internet router or home base station belonging to or used by the user of the UE 105; (v) a wireless charging unit for the UE 105; and/or (vi) a vehicle or wireless device integrated in a vehicle belonging to the user of the UE 105. PD(s) 106 may further include or comprise UEs or other wireless capable devices not belonging to or normally associated with the user of the UE 105 but nearby to the UE 105 and discovered by the UE 105 using such techniques as peer to peer (P2P), LTE Direct, Wi-Fi Direct or Bluetooth communication and where some level of trust may exist between the UE 105 and the PD(s) 106 (e.g. based on PD(s) 106 belonging to a friend, relative or co-worker of the user of the UE 105).

One or more of the PD(s) 106 however, may not be aware of some or all of nearby AP(s) 130, nearby base station(s) 120, and/or some or all of the locations of AP(s) 130 and base station(s) 120, in which case the locations of PD(s) 106 may not be known or not accurately known. In this case, it may not be possible to obtain a location for the UE 105 using measurements made by the UE 105 of signals received from PD(s) 106 and/or measurements made by PD(s) 106 of signals received from the UE 105. Exemplary embodiments of the disclosure herein address these problems, both individually and collectively, in greater detail below in conjunction with FIGS. 2-11.

In order to make use of PD(s) 106 to help locate the UE 105, the UE 105 may communicate with location server(s) 160 in order to obtain assistance data that may then be provided by the UE 105 to PD(s) 106 to enable or help enable PD(s) 106 to obtain location measurements and possibly compute a location(s) of PD(s) 106. The UE 105 may also or instead communicate with location server(s) 160 to enable location server(s) 160 to request and obtain location measurements from PD(s) 106 that may be used by location server(s) 160 to compute a location for PD(s) 106 and/or for the UE 105. The assistance data sent by location server(s) 160 for PD(s) 106 and/or a request for location information sent by location server(s) 160 for PD(s) 106 may (i) be sent to the UE 105 by location server(s) 106 and transferred to PD(s) 106 by the UE 105, and/or (ii) correspond to positioning capabilities for PD(s) 106 obtained by the UE 105 from PD(s) 106 and transferred to location servers) 160 by the UE 105. The PD(s) 106 may be used by the UE 105 and/or by location server(s) 160 as additional sources of location information that can be used to help determine a location for the UE 105. For example, if PD(s) 106 are very nearby to the UE 105 (e.g. within 10 meters of the UE 105), location server(s) 160 and/or the UE 105 may assume PD(s) 106 are at the same location as the UE 105 and may then use any location measurements obtained by PD(s) 106 (e.g. SPS, terrestrial or sensor based location measurements) as if the measurements had been obtained by the UE 105, which may enable a location of the UE 105 when the UE 105 is unable to obtain sufficient location measurements by itself. In another example, the UE 105 may obtain the location of the UE 105 relative to the location of PD(s) 106 as described previously and PD(s) 106, the UE 105 or location server(s) 160 may obtain the absolute location(s) of PD(s) 106 using a position method (or methods) such as A-GNSS, OTDOA, ECID, Wi-Fi and/or SRN as described previously for the UE 105. UE 105 or location server(s) 160 may then combine the location of the UE 105 relative to PD(s) 106 with the absolute location(s) of PD(s) 106 to obtain an absolute location of the UE 105. As a simple example, if the range, bearing and inclination of the location of the UE 105 is known relative to the location of one PD 106 and the absolute location of the PD 106 is also known, then the absolute location of the UE 105 can be obtained.

The use of PD(s) 106 to determine or help determine a location for the UE 105 as just described and as further described below may be useful when the UE 105 is not able to receive signals 134, 140 and 111 from AP(s) 130, BS(s) 120 and/SPS(s) 110, respectively, or not able to receive signals 134, 140 and 111 from a sufficient number of APs 130, BSs 120 and/or SPS 110 SVs, respectively, to enable a location of the UE 105 to be obtained using measurements of these signals. For example, if one or more PDs 106 are at locations where each PD 106 can receive signals from more APs 130, BSs 120 and/or SPS 110 SVs than the UE 105, then it may be possible for PD(s) 106, the UE 105 and/or location server(s) 160 to obtain a location for the UE 105 as just described. In addition or alternatively, location of the UE 105 may be possible (e.g. when a location of the UE 105 is not possible using location measurements obtained only by the UE 105) if PD(s) 160 support location measurements and/or position methods that are not supported by the UE 105—e.g. if PD(s) 106 but not UE 105 support A-GNSS, OTDOA, ECID, Wi-Fi and/or SRN positioning. In another example, location of the UE 105 may be possible (e.g. when a location of the UE 105 is not possible using location measurements obtained only by the UE 105) if PD(s) 160 have more resources for performing positioning than the UE 105 (e.g. more processing capacity, more memory, better algorithms, more battery power).

Figure 2:
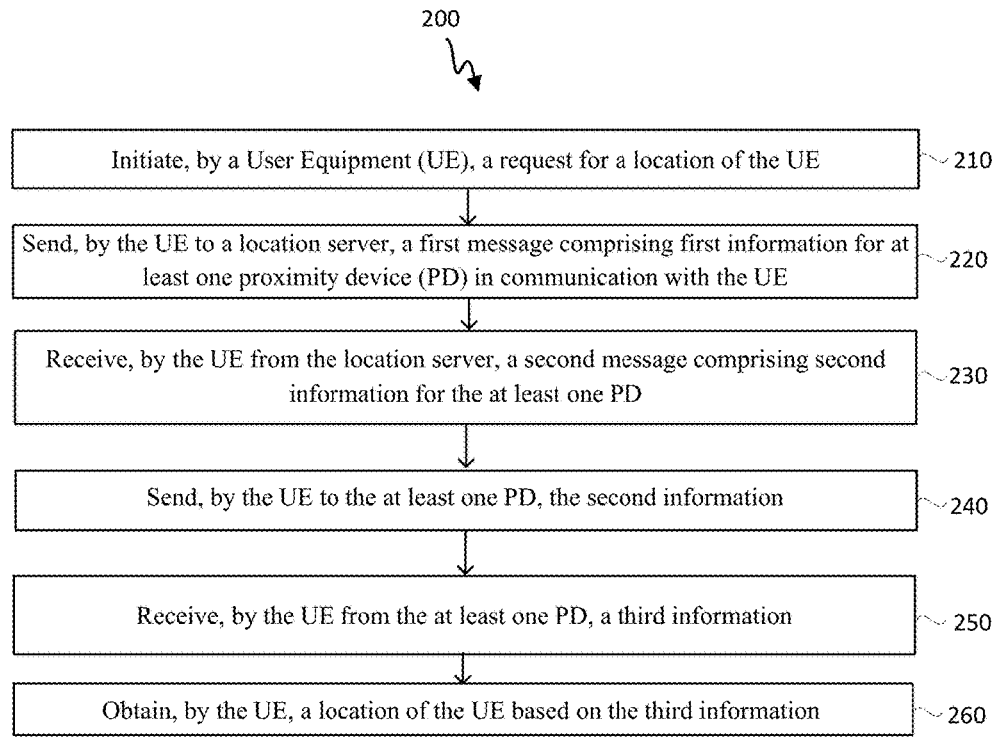
FIG. 2 and FIG. 5 each illustrate an exemplary operation flow of various aspects of the disclosure.
Figure 3:
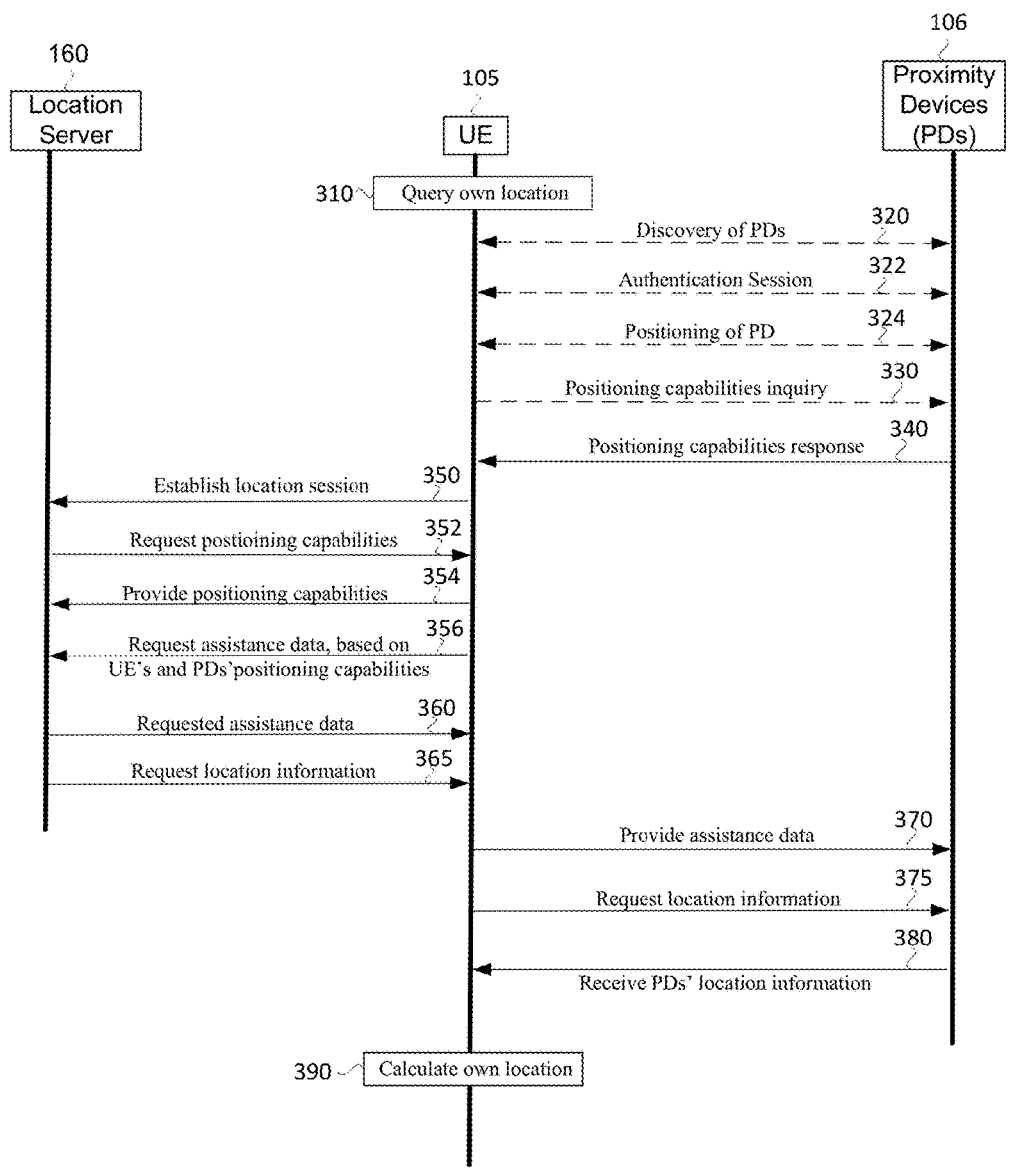
FIG. 3 and FIG. 4 are exemplary signaling flow diagrams illustrating various aspects of the disclosure according to the exemplary operation flows of FIG. 2 and FIG. 5.
Figure 4:
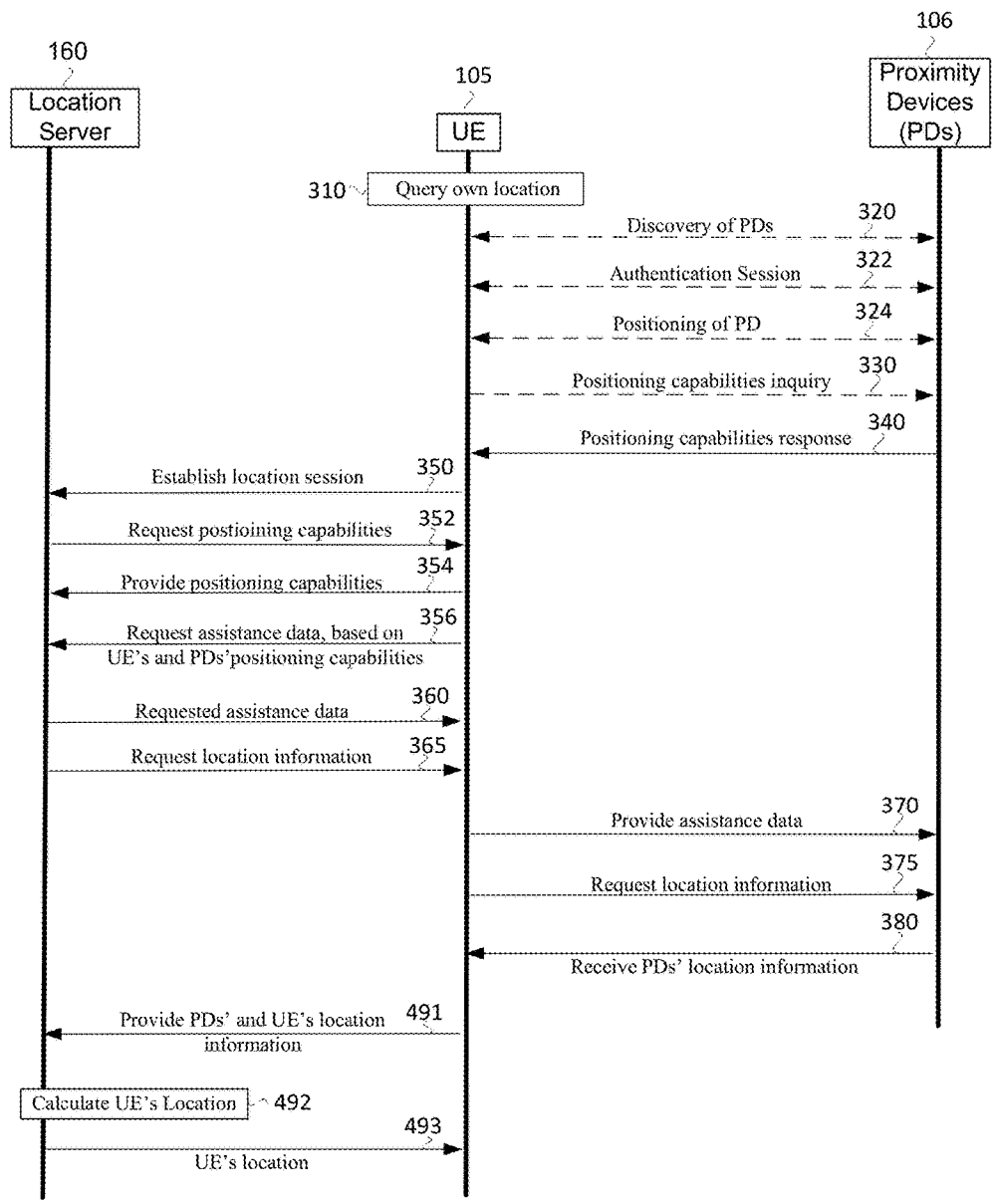

FIG. 2 illustrates an exemplary operation flow which, in conjunction with signaling flow diagrams of FIG. 3 and FIG. 4, illustrates a process flow 200 performed by the UE 105 for locating the UE 105 by the UE 105. Like numbered Actions in FIGS. 3 and 4 (and in FIGS. 7 and 8) may be similar or identical. In an exemplary embodiment, the UE 105 is configured to perform the one or more blocks of the process flow 200. Particular means for performing the illustrated blocks can be performed by hardware and/or software components of the UE 105, such as the components illustrated in FIG. 10 and described in further detail below. Additionally, as with other figures provided herein, FIG. 2 is provided as an example. Other exemplary embodiments of the invention may perform similar methods in different manners, by, for example, adding, omitting, combining, separating, rearranging, and/or otherwise altering the blocks illustrated in FIG. 2. A person of ordinary skill in the art will recognize many variations.

Process flow 200 can begin at block 210 of FIG. 2, in which the UE 105, initiates a request for a location of the UE 105, as also shown in Action 310 of FIGS. 3-4. For example an application executed by the UE 105 requests a location of the UE 105, and other components of the UE 105 act to fulfil the request as illustrated in FIG. 2.

In an exemplary embodiment, as shown in FIGS. 3-4, the UE 105 may then perform one or more of the following optional actions with the PD(s) 106, such as one or more of the PDs 106_a, 106_b or 106_c: (1) discover the PD(s) 106, such as PD 106_a, in communication with the UE 105 (Action 320); (2) establish an authentication session to authenticate, and/or enable authentication by, the discovered PD(s) 106 (Action 322); and/or (3) obtain from, or be provided with, positioning information for the PD(s) 106 (Action 324). For action 320, the UE 105 and PD(s) 106 may use LTE Direct (also referred to a Proximity-based Services (ProSe)) as defined by 3GPP, Wi-Fi Direct as defined by the Wi-Fi Alliance, Bluetooth or some other wireless technology to enable the UE 105 to discover PD(s) 106 (and/or to enable PD(s) 106 to discover UE 105). For action 324, UE 105 and/or PD(s) 106 may obtain relative locations of UE 105 and/or of PD(s) 106 as described previously in association with FIG. 1 and/or may obtain a range (e.g. distance) between the UE 105 and each of PD(s) 106. The UE 105 may use a range between the UE 105 and each of PD(s) 106 to determine PD(s) 106 which are nearby to UE 105 (e.g. within 100 meters of the UE 105 in one embodiment or within 10 meters of UE 105 in another embodiment). As part of Action 324, the UE 105 may determine to communicate only with PD(s) 106 that are nearby to the UE 105 in Actions 330, 340, 370, 375 and 380.

The PD(s) 106 may also provide the UE 105 with the positioning capabilities of the PD(s) 106 (Action 340), such as capabilities to support terrestrial, SPS and/or sensor related measurements and/or capabilities to support assistance data and position methods such as GNSS, A-GNSS, ECID, Wi-Fi, WLAN, SRN, etc. In one exemplary embodiment, the positioning capabilities include the capability of the PD(s) 106 to use assistance data that is provided by the location server(s) 160 via the UE 105, as further described below. In another exemplary embodiment, the positioning capabilities includes the capability of the PD(s) 106 to obtain location information requested by the location server(s) 160 via the UE 105, as further described below. In an exemplary embodiment, the PD(s) 106 provide their positioning capabilities to the UE 105 in response to a prior positioning capability inquiry made by the UE 105 (Action 330). In some embodiments, Actions 320-340 and Actions 370-380 described below are supported using LTE Direct, Wi-Fi Direct or Bluetooth communication between the UE 105 and the PD(s) 106.

Next, in block 220 of FIG. 2, the UE 105 sends to location server(s) 160, a first message comprising first information for at least one PD 106 in communication with UE 105 (e.g. due to one or more of Actions 320-340). The first information may comprise the received positioning capabilities of the PD(s) 106 as well possibly as the positioning capabilities of the UE 105, as also shown in Action 354 of FIG. 3. The first information may instead comprise a request for assistance data as described later, and as also shown in Action 356 of FIGS. 3-4. In case the first information comprises a request for assistance data as in Action 356, Action 354 may still be performed by the UE 105 to provide the location server(s) 160 with the positioning capabilities of the UE 105 and PD(s) 106. In an exemplary embodiment, as shown in FIG. 3, Actions 354 and/or 356 (whichever occur) may be preceded by initiating and establishing a location session between the UE 105 and the location server(s) 160 prior to or in combination with sending the first message (Action 350). Location session establishment at Action 350 may be for a control plane location solution (e.g. a control plane location solution defined by 3GPP in 3GPP Technical Specifications (TSs) 23.271 and 36.305) or may be for a user plane location solution (e.g. the SUPL location solution defined by OMA). In addition, Action 354 (if Action 354 occurs) may be preceded by the UE 105 receiving from the location server(s) 160, a request for positioning capabilities of the PD(s) 106 as well the positioning capabilities of the UE 105 (Action 352). Location session establishment in Action 350 may be according to a control plane solution (e.g. if location server(s) 160 correspond to an E-SMLC) or a user plane solution (e.g. if location server(s) 160 correspond to an SLP).

In an exemplary embodiment, the first information may include a request for assistance data from the location server(s) 160 (e.g. as at Action 356 in FIGS. 3-4), such as based on positioning capabilities of the UE 105 and/or the PD(s) 106. Exemplary assistance data may include a list of AP(s) 130 and, for each listed AP, a number of attributes such as an AP identity (e.g. a Media Access Control (MAC) Address), supported wireless technologies (e.g. IEEE 802.11a/b/g/n/ac etc., Bluetooth Low Energy (BLE), NFC), supported channels, and/or location coordinates. This assistance data when transferred to any PD 106 (as described later) may enable the PD 106 to obtain measurements from one or more of the listed AP(s) 130 such as measurements of RSSI, RTT, S/N, AOA, and possibly compute a location of the PD 160 using a Wi-Fi, SRN or other position method similarly to positioning described earlier for the UE 105 in association with FIG. 1. Exemplary assistance data may also or instead include assistance data for A-GNSS, ECID, OTDOA and/or other position methods associated with measurements of signals from BS(s) 120 (e.g. in the case of ECID and OTDOA) and measurements of signals from SPS(s) 110 (e.g. in the case of A-GNSS). This assistance data when transferred to any PD 106 (as described later) may enable the PD 106 to obtain measurements from one or more of the BS(s) 120, such as measurements of RSSI, RTT, S/N, AOA, TOA, RSRP, RSRQ and/or RSTD and/or may enable the PD 106 to obtain measurements from one or more SPS(s) 110, such as measurements of pseudo-range or code phase. The assistance data may further enable a PD 106 to compute the location of the PD 106—e.g. using an ECID or OTDOA or A-GNSS position method similarly to that described previously for positioning of the UE 105 in association with FIG. 1. Other forms of assistance data, such as for sensors are also contemplated to be within the scope of the disclosure.

Next, in block 230 of FIG. 2, the UE 105 receives from the location server(s) 160 a second message including second information for at least one PD 106. In an exemplary embodiment, the second information includes assistance data supported by the PD(s) 106 and possibly by the UE 105, as also shown in Action 360 in FIGS. 3-4. The inclusion of assistance data in the second information (e.g. as at Action 360 in FIG. 3) may occur when the first information includes a request for assistance data (e.g. as at Action 356), in which case the assistance data included in the second information may correspond to at least a portion (e.g. some or all) of the assistance data requested in the first information (e.g. at Action 356 in FIGS. 3-4). The inclusion of assistance data in the second information (e.g. as at Action 360 in FIGS. 3-4) may instead occur when the first information comprises the positioning capabilities of the PD(s) 106 and possibly the UE 105 (e.g. as at Action 354), in which case the assistance data included in the second information may correspond to at least a portion (e.g. some or all) of the assistance data supported by the PD(s) and the UE 105 according to the positioning capabilities in the first information.

In another embodiment of block 230, the second information includes a request for location information, as at Action 365 in FIGS. 3-4. The request for location information may be for the PD(s) 106 and possibly for the UE 105. The location information that is requested (e.g. from the PD(s) 106 and possibly UE 105) may include terrestrial measurements for BS(s) 120 and/or for AP(s) 130 (e.g. measurements of RSSI, RTT, S/N, TOA, AOA, RSRP, RSRQ and/or RSTD), SPS measurements for SPS(s) 110 (e.g. pseudo-range, code phase and/or carrier phase), measurements for sensors, location estimates for the PD(s) 106 and/or the UE 105, and/or other measurements. The location information that is requested according to the second information may be indicated as being supported by the PD(s) 106 and/or the UE 105—e.g. according to positioning capabilities for the PD(s) 106 and/or the UE 105 included in the first information, or sent separately to the location server(s) 160 (e.g. as in Action 354 in FIG. 3). In this embodiment, the location server(s) 160 may still send assistance data to the UE 105 for PD(s) 106 and/or for the UE 105—e.g. as at Action 360 in FIGS. 3-4. Action 365 may also occur prior to Actions 356 and 360 in some embodiments when all three Actions occur. In some embodiments, Action 365 may not occur.

Next, in block 240 of FIG. 2, the UE 105 sends to at least one PD 106, the second information. When the second information includes assistance data supported by the PD(s) 106, the UE sends the assistance data to the PD(s) 106 as also shown in Action 370 in FIGS. 3-4. When the second information includes a request for location information for the PD(s) 106, the UE 105 sends the request for location information to the PD(s) 106 as also shown in Action 375 in FIGS. 3-4. In either case, the UE 105 may first perform filtering of the second information, according to the positioning capabilities of each PD 106, before sending the second information to the PD(s) 106. For example, when the second information includes assistance data for PDs 106_a, 106_b and 106_c, the UE 105 may send to PD 106_a only the assistance data that is supported by PD 106_a according to positioning capabilities of PD 106_a(e.g. as received by the UE 105 in Action 340 in FIGS. 3-4), and may similarly send to each of PDs 106_b and 106_c only the assistance data that is supported by these PDs according to their positioning capabilities (e.g., as also received by the UE 105 at Action 340 in FIGS. 3-4).

Similarly, when the second information in block 240 includes a request for location information for PDs 106_a, 106_b and 106_c, the UE 105 may send to PD 106_a only a request for location information supported by PD 106_a according to positioning capabilities of PD 106_a(e.g. as received by the UE 105 in Action 340 in FIGS. 3-4), and may similarly send to each of PDs 106_b and 106_c only a request for location information that is supported by these PDs according to their positioning capabilities (e.g., as also received by UE at Action 340 in FIGS. 3-4). In the case that the second information includes assistance data for PD(s) 106, Action 375 may still be performed by the UE 105 in FIGS. 3-4 as well as Action 370 in order to allow the UE 105 to request location information from PD(s) 106 (e.g. to request terrestrial measurements for AP(s) 130 and/or BS(s) 120 and/or SPS measurements for SPS(s) 110). Similarly, when the second information includes a request for location information from PD(s) 106, Action 370 may still be performed by the UE 105 in FIGS. 3-4 as well as Action 375 in order to allow the UE 105 to provide Assistance Data to PD(s) 106 (e.g. assistance data supported by PD(s) 106 according to positioning capabilities received at Action 340) to assist PD(s) 106 to obtain the requested location information.

In an exemplary embodiment, Action 375 may occur prior to Action 370. In this embodiment PD(s) 106 may request assistance data from the UE 105 (e.g. assistance data needed by PD(s) 106 to obtain location information requested in Action 375) prior to Action 370 (not shown in FIGS. 3-4).

Next, in block 250 of FIG. 2, the UE 105 receives from at least one PD 106, a third information, which may include location information obtained by the PD(s) 106, as also shown in Action 380 of FIGS. 3-4. In an exemplary embodiment the received location information of the PD(s) 106 is obtained or determined by the PD(s) 106 based on assistance data provided by the UE 105 to PD(s) 106, as at Action 370 in FIGS. 3-4. The location information included in the third information may include terrestrial measurements for BS(s) 120 and/or for AP(s) 130 (e.g. measurements of RSSI, RTT, S/N, TOA, AOA, RSRP, RSRQ and/or RSTD), SPS measurements for SPS(s) 110 (e.g. pseudo-range, code phase and/or carrier phase), measurements for sensors, location estimates for the PD(s) 106 and/or other measurements. In an embodiment, the location information obtained by the PD(s) 106 and included in the third information may correspond to at least a portion (e.g. some or all) of location information requested by the UE 105 (e.g. as at Action 375 in FIGS. 3-4), and/or may be based on assistance data provided by the UE 105 (e.g. as at Action 370 in FIGS. 3-4).

Next, in block 260 of FIG. 2, the UE 105 obtains its location based on the received third information, such as based at least in part on the received location information for the PD(s) 106. In an exemplary embodiment, as shown in Action 390 of FIG. 3, the UE 105 obtains its own location by calculating a location of the UE 105 based on the third information, such as based at least in part on the received location information for the PD(s) 106. In another exemplary embodiment, as shown in Actions 491, 492 and 493 of FIG. 4, the UE 105 obtains its location with the help of the location server(s) 160 by sending to the location server(s) 160 a message which includes the third information, such as the location information for the PD(s) 106, (Action 491), and then receives a message (Action 493) from the location server(s) 160 which includes a server-calculated location (Action 492) of the UE 105. In calculating a location of the UE 105, either at Action 390 in FIG. 3 or Action 492 in FIG. 4, location information for the PD(s) 106 may be used as provided in the third information (e.g. at Action 380 in FIGS. 3-4) as well as location measurements obtained by the UE 105 and/or locations or relative locations for the UE 105 and/or the PD(s) 106 obtained by the UE 105, such as for Action 324 in FIGS. 3-4. For example, the UE 105 for Action 390 or location server(s) 160 for Action 492 may use the location information for the PD(s) 106 included in the third information to first calculate absolute locations of the PD(s) 106 and may then use location(s) for the UE 105 relative to the PD(s) 106 obtained by Action 324 to obtain the absolute location of the UE 105. Alternatively, the UE 105 for Action 390 or location server(s) 160 for Action 492 may combine the location information for the PD(s) 106 to obtain a single location estimate which may be used as a location for the UE 105: with this approach, the UE 105 or location server(s) 160 may act as if the PD(s) 106 and the UE 105 share the same location which may be accurate when the PD(s) 106 and the UE 105 are close together (e.g. within 10 meters of one another).

In an embodiment where Action 365 occurs, the UE 105 may send the location of UE 105 calculated at Action 390, or the location measurements used by the UE 105 to calculate the location at Action 390, to location server(s) 160 (not shown in FIG. 3)—e.g. in response to the request in Action 365. The location server(s) 160 may store the received location information to assist location of the UE 105 at a later time and/or may use the location information for other purposes—e.g. for network optimization.

In an embodiment, process flow 200 (and/or process flow 600 described later) may be performed by an application on the UE 105.

Information exchanged between location server(s) 160 and the UE 105 may include information applicable to PD(s) 106 in blocks 220 and/or 230 for process flow 200, and/or for Actions 350, 352, 354, 356, 360 and/or 365 in FIGS. 3-4. As described later, information exchanged between location server(s) 160 and the UE 105 and/or information determined by location server(s) 160 may include information for PD(s) 106 in blocks 510, 520, 530 and/or 540 of process flow 500 in FIG. 5, blocks 620 and/or 630 for process flow 600 in FIG. 6, blocks 920, 930, 940 and/or 950 of process flow 900 for FIG. 9, and/or for Actions 350, 352, 354, 356, 360 and/or 365 in FIGS. 7-8. The information for PD(s) 106 for these blocks and Actions may be represented according to three alternative embodiments, labelled for convenience embodiment E1, embodiment E2 and embodiment E3 as next described.

With embodiment E1, the UE 105 hides the existence of the PD(s) 106 from location server(s) 160 by indicating to location server(s) 160 that positioning capabilities for PD(s) 106 are positioning capabilities for the UE 105 (e.g. for Action 354) and/or that Assistance data requested for PDs 106 is assistance data requested for UE 105 (e.g. for Action 356). The UE 105 may thus act as if the UE 105 supports all the positioning capabilities of the PD(s) 106 and supports all the assistance data supported by the PD(s) 106. Location server(s) 160 may then behave as if the location of the UE 105 needs to be supported but not the location of the PD(s) 106 because, from the perspective of location server(s) 160, there are no PD(s) 106 for which location support is needed. With Embodiment E1, the UE 105 may: (i) establish a single location session for the UE 105 at Action 350 (e.g. in FIGS. 3, 4, 7 and 8); (ii) send combined positioning capabilities for the UE 105 and the PD(s) 106 to location server(s) 160 at Action 354 (e.g. in FIGS. 3, 4, 7 and 8); (iii) send a request for combined assistance data supported by the UE 105 and the PD(s) 106 to location server(s) 160 at Action 356 (e.g. in FIGS. 3, 4, 7 and 8); (iv) receive combined assistance data supported by the UE 105 and the PD(s) 106 from location server(s) 160 at Action 360 (e.g. in FIGS. 3, 4, 7 and 8); and/or (v) receive a request from location server(s) 160 for combined location information supported by the UE 105 and the PD(s) 106 at Action 365 (e.g. in FIGS. 3, 4, 7 and 8). With embodiment E1, the UE 105 and location server(s) 160 may use traditional control plane and/or user plane location solutions and traditional positioning protocols (such as 3GPP LPP and/or OMA LPPe) which support location of only one UE, to support Actions 350-365 which may simplify implementation.

With embodiment E2, the UE 105 may indicate the existence of PD(s) 106 to location server(s) 160 by providing some explicit or implicit identifier for each PD 106 to location server(s) 160 and by explicitly indicating to location server(s) 160 the positioning capabilities of each identified PD 106 (e.g. at Action 354 in FIGS. 3, 4, 7 and 8) and/or the assistance data supported by, and requested on behalf of, each PD 106 (e.g. at Action 356 in FIGS. 3, 4, 7 and 8). The identifier provided by the UE 105 for each PD 106 may be global (e.g. an IEEE 802.11 or Bluetooth MAC address or a 3GPP Mobile Station International Subscriber Directory Number (MSISDN)) or may be local such as a numeric, alphabetic or alphanumeric label. The UE 105 may establish a single location session with location server(s) 160 rather than a separate location session for each PD 106 (e.g. at Action 350 in FIGS. 3, 4, 7 and 8). The UE 105 may also or instead exchange a single message (e.g. a single LPP or LPP/LPPe positioning protocol message) with location server(s) 160 rather than a separate message for each PD 106 when requesting or receiving positioning capabilities (e.g. at Actions 352 and 354 in FIGS. 3, 4, 7 and 8), assistance data (e.g. at Actions 356 and 360 in FIGS. 3, 4, 7 and 8), and/or location information (e.g. at Action 365 in FIGS. 3, 4, 7 and 8, and at Action 491 in FIGS. 4 and 8).

With embodiment E3, as in Embodiment E2, the UE 105 may indicate the existence of PD(s) 106 to location server(s) 160 by providing some explicit or implicit identifier for each PD 106 to location server(s) 160 and by explicitly indicating to location server(s) 160 the positioning capabilities of each identified PD 106 (e.g. at Action 354 in FIGS. 3, 4, 7 and 8) and/or the assistance data supported by, and requested on behalf of, each PD 106 (e.g. at Action 356 in FIGS. 3, 4, 7 and 8). The UE 105 may further establish or help establish a separate location session with location server(s) 160 for each PD 106 (e.g. at Action 350 in FIGS. 3, 4, 7 and 8). The UE 105 may also or instead exchange a separate message (e.g. a separate LPP or LPP/LPPe positioning protocol message) with location server(s) 160 for each PD 106 when requesting or receiving positioning capabilities for the PD 106 (e.g. at Actions 352 and 354 in FIGS. 3, 4, 7 and 8), assistance data for the PD 106 (e.g. at Actions 356 and 360 in FIGS. 3, 4, 7 and 8), and/or location information for the PD 106 (e.g. at Action 365 in FIGS. 3, 4, 7 and 8 and Action 491 in FIGS. 4 and 8). With embodiment E3, there may be a separate location session between the UE 105 and location server(s) 160 for each PD 106. The separate location session for a PD 106 may be terminated at the UE 105 or may be terminated at the PD 106 with the UE 105 acting as a relay to transfer messages between location server(s) 160 and the PD 106 (e.g. with UE relaying a message received in Action 360 from location server(s) 160 to a PD 106 in Action 370 in FIGS. 3 and 4).

Figure 10:
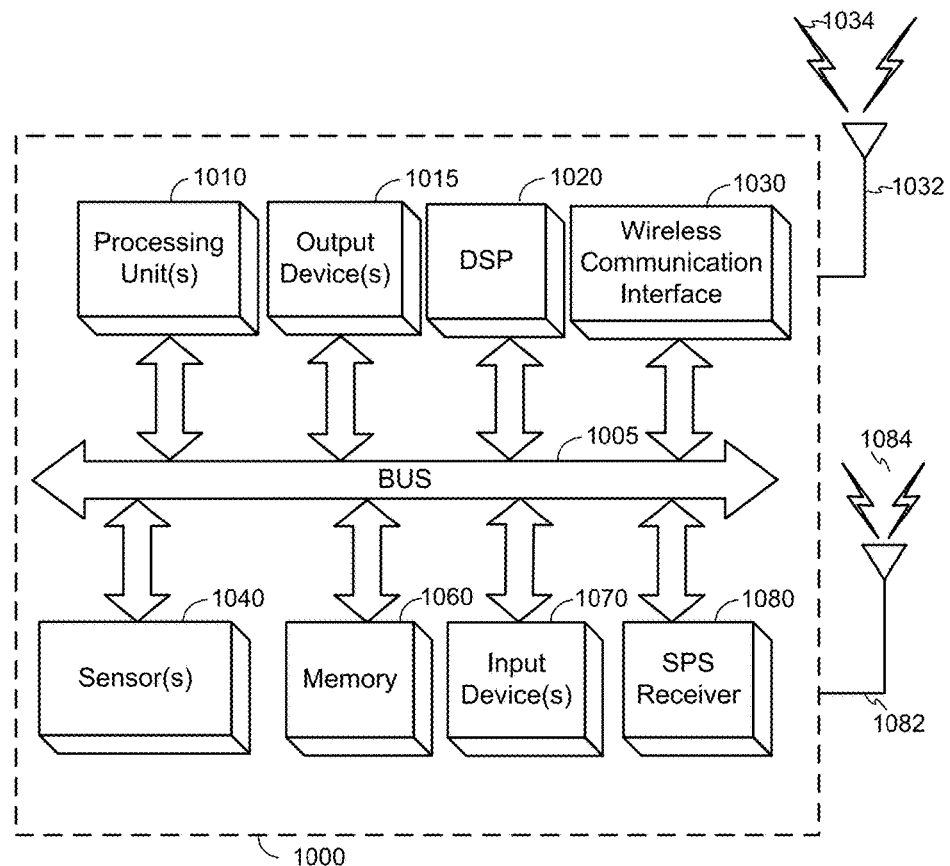
FIG. 10 is a block diagram of an exemplary User Equipment or Proximity Device.

Returning to FIG. 2, apparatus and means for performing the functionality of blocks 210, 240, 250 and corresponding Action(s) 320-340 and 370-380 may comprise, for example, the processing unit(s) 1010, memory 1060, SPS receiver 1080 and antenna 1082, wireless communication interface 1030 and/or antenna 1032, as shown in FIG. 10 and described in further detail below. For example, processing unit(s) 1010 can be configured to cause the wireless communication interface 1030 to detect or discover, authenticate, and to request and receive positioning, and positioning capabilities of the PD(s) 106, as well as provide assistance data, and request and receive location information and/or positioning capabilities to and from the PD(s) 106.

Apparatus and means for performing the functionality of blocks 220, 230 and 260, and corresponding Action(s) 350-365, 491 and 493 may comprise, for example, the processing unit(s) 1010, memory 1060, SPS receiver 1080 and antenna 1082, wireless communication interface 1030 and/or antenna 1032, as shown in FIG. 10 and described in further detail below. For example, processing unit(s) 1010 can be configured to cause the wireless communication interface 1030 to establish a location session with the location server(s) 160, and to receive from a request for, and provide to, positioning capabilities of the PD(s) 106 and the UE 105, as well as request and/or receive assistance data and a request for location information, and to provide location information to the location server(s) 160 and receive the server-calculated location of the UE 105.

Figure 5:
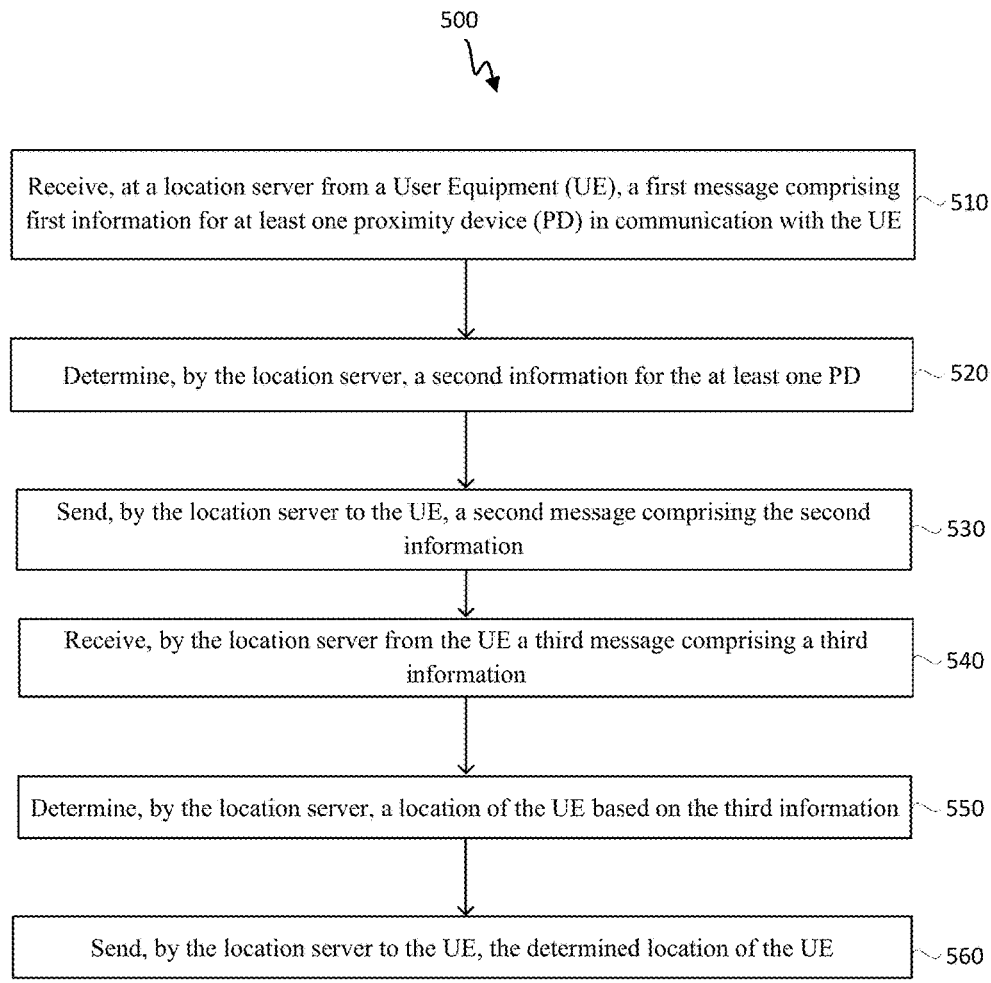

FIG. 5 illustrates an exemplary operation flow which, in conjunction with signaling flow diagrams of FIGS. 3 and 4, illustrates a process flow 500 performed by the location server(s) 160 for enabling location of the UE 105 by the UE 105.

Process flow 500 can begin at block 510 of FIG. 5, in which the location server(s) 160 receives from the UE 105 a first message comprising first information for at least one PD 106 in communication with the UE 105. As previously described in conjunction with block 220 of FIG. 2, the first information may include a request for assistance data from the location server(s) 160, such as based on positioning capabilities of the UE 105 and the PD(s) 106, as also shown in Action 356 of FIGS. 3-4. In an exemplary embodiment, Action 356 may have been preceded by some or all of the previously described Actions 310-354 of FIGS. 3-4. As previously described in conjunction with block 220 of FIG. 2, the first information may instead comprise the positioning capabilities of the PD(s) 106 as well possibly as the positioning capabilities of the UE 105, as also shown in Action 354 of FIGS. 3-4. In an exemplary embodiment, Action 354 may have been preceded by some or all of the previously described Actions 310-352 of FIGS. 3-4.

Next, in block 520 of FIG. 5, the location server(s) 160 determines a second information for the at least one PD 106. In an exemplary embodiment, the second information includes assistance data supported by the PD(s) 106 and possibly by the UE 105. In this embodiment, the assistance data may be determined by the location server(s) 160 based on a request for assistance data included in the first information received at block 510. For example, the assistance data determined in block 520 may correspond to a portion (e.g. some or all of) the assistance data requested in the first information. Alternatively in this embodiment, the assistance data may be determined by the location server(s) 160 based on positioning capabilities for the PD(s) 106 and the UE 105 received in the first information at block 510. For example, the assistance data determined in block 520 may correspond to a portion (e.g. some or all of) assistance data that is supported by the PD(s) 106 and possibly the UE 105 according to positioning capabilities in the first information.

In another exemplary embodiment, the second information determined at block 520 includes a request for location information for the PD(s) 106 and/or for the UE 105. In this embodiment, the location information that is determined to be requested in block 520 may include a request for terrestrial measurements for BS(s) 120 and/or for AP(s) 130 (e.g. measurements of RSSI, RTT, S/N, TOA, AOA, RSRP, RSRQ and/or RSTD), a request for SPS measurements for SPS(s) 110 (e.g. pseudo-range, code phase and/or carrier phase), a request for measurements for sensors, a request for location estimates for the PD(s) 106 and/or the UE 105, and/or a request for other measurements. The location information that is determined to be requested in block 520 may be determined by the location server(s) 160 based on positioning capabilities for the PD(s) 106 and the UE 105 received in the first information at block 510. For example, the location information determined to be requested in block 520 may correspond to a portion (e.g. some or all of) the location information that is supported by PD(s) 106 and possibly the UE 105 according to the positioning capabilities in the first information.

Next, in block 530, the location server(s) 160 sends to the UE 105, a second message comprising the second information, such as assistance data supported by the PD(s) 106 and/or the UE 105, assistance data requested by the UE 105, or a request for location information for PD(s) 106 and the UE 105. Block 530 may correspond to Action 360 or Action 365 of FIGS. 3-4.

Next, in block 540 of FIG. 5, the location server(s) 160 receives from the UE 105 (e.g. in response to the sent second message) a third message comprising a third information. In an exemplary embodiment, the third information includes location information for the PD(s) 106 and/or the UE 105, as shown in Action 491 of FIG. 4. In an exemplary embodiment, Action 491 may have been preceded by some or all of the Actions 370-380 in FIG. 4, by which the third information is obtained by the UE 105. For example, location information included in the third information may have been obtained (e.g. measured) by the PD(s) 106 and/or by the UE 105 and may include terrestrial measurements for BS(s) 120 and/or for AP(s) 130 (e.g. measurements of RSSI, RTT, S/N, TOA, AOA, RSRP, RSRQ and/or RSTD), SPS measurements for SPS(s) 110 (e.g. pseudo-range, code phase and/or carrier phase), measurements for sensors, location estimates for the PD(s) 106 and/or other measurements. In an embodiment, the location information included in the third information may correspond to at least a portion (e.g. some or all) of location information requested by location server(s) 160 in the second information sent in the second message at block 530.

Next, in block 550 of FIG. 5, the location server(s) 160 determines, such as by calculating, a location of the UE 105 based on the received third information, as shown in Action 492 of FIG. 4. In determining a location of the UE 105 in block 550, the location server(s) 160 may make use of known BSA data for BS(s) 120 and/or AP(s) 130, and/or known SV ephemeris, timing and other data for SPS(s) 110. Next, in block 560 of FIG. 5, the location server(s) 160 sends the determined location of the UE 105 to the UE 105, as shown in Action 493 of FIG. 4.

Blocks 540-560 of process flow 500 are optional blocks and may not be included in all embodiments. For example, if the UE 105 calculates its own location, as at Action 390 in FIG. 3, blocks 540-560 may not be performed.

Figure 11:
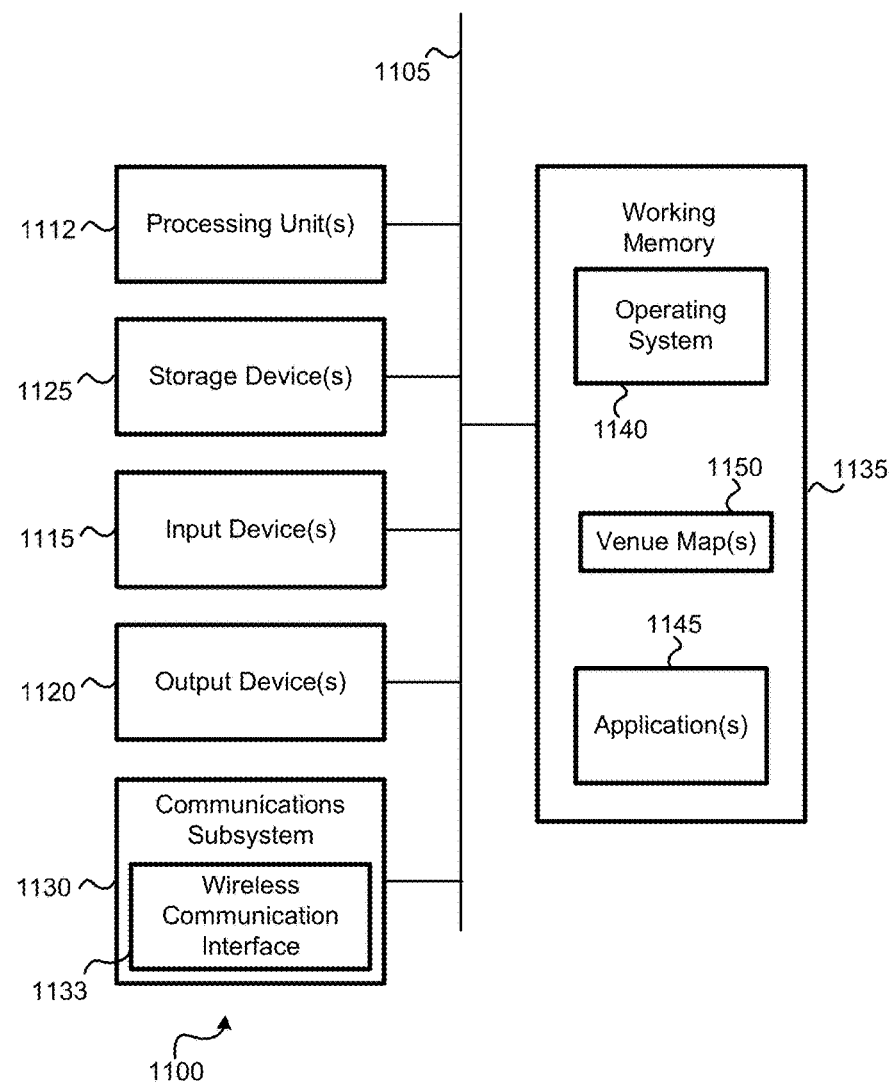
FIG. 11 is a block diagram of an exemplary computer system.

The apparatus and means for performing the functionality of blocks 510-560, and corresponding Action(s) 350-365, and 491-493 may comprise, for example, the processing unit(s) 1112, memory storage devices 1125, Communication Subsystem 1130 which includes wireless communication interface 1133, as shown in FIG. 11 and described in further detail below. For example, processing unit(s) 1112 can be configured to cause the wireless communication interface 1133 to (i) establish a location session with the UE 105, (ii) receive from the UE 105 a request for assistance data and/or positioning capabilities of the PD(s) 106 and/or the UE 105, and (iii) send a request for location information, assistance data and/or a server-calculated location of the UE 105 to the UE 105.

Figure 6:
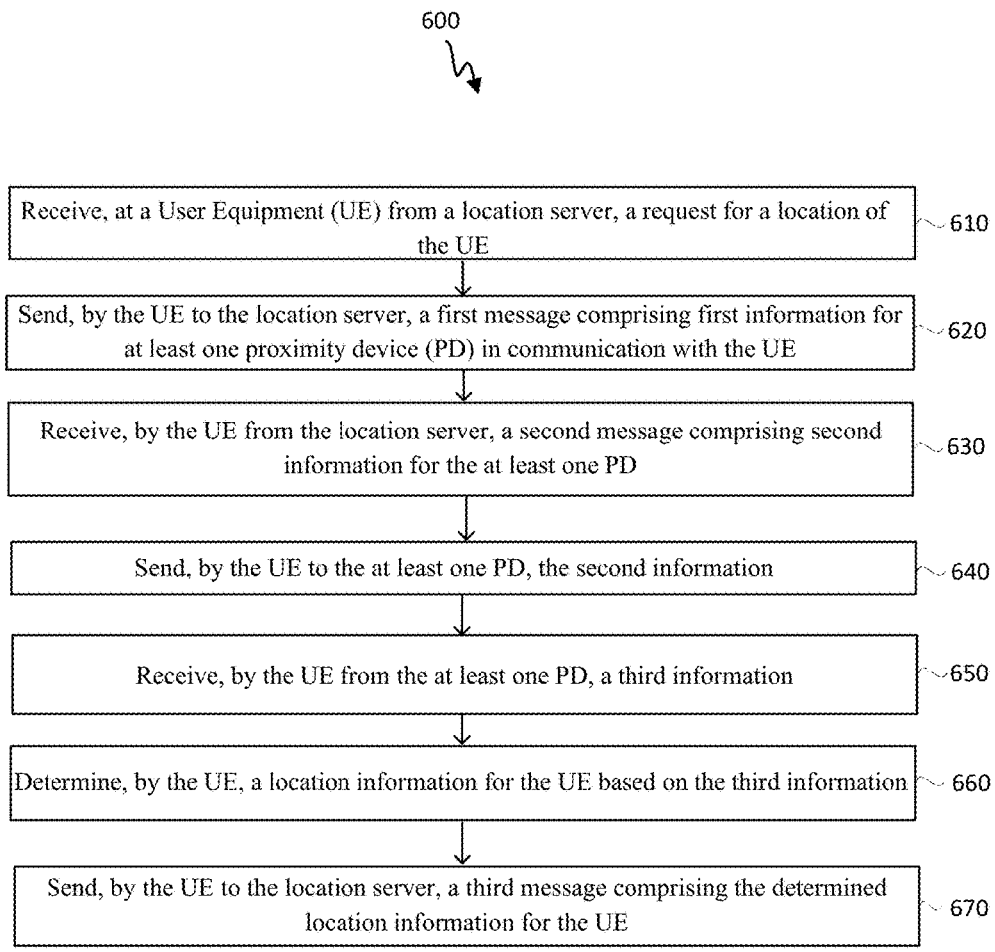
FIG. 6 and FIG. 9 each illustrate an additional exemplary operation flow of additional various aspects of the disclosure.
Figure 7:
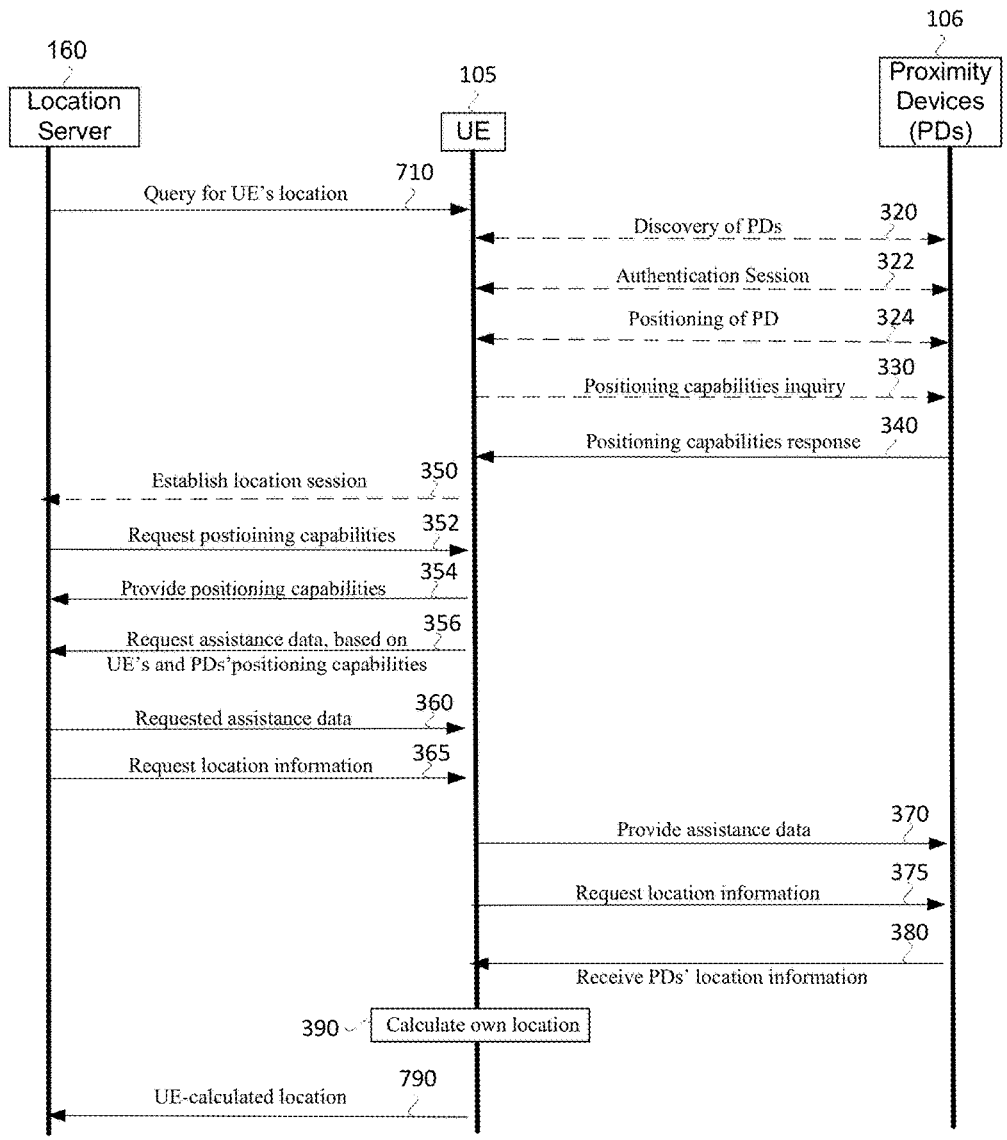
FIG. 7 and FIG. 8 are exemplary signaling flow diagrams illustrating various aspects of the disclosure according to exemplary operation flows of FIG. 6 and FIG. 9.
Figure 8:
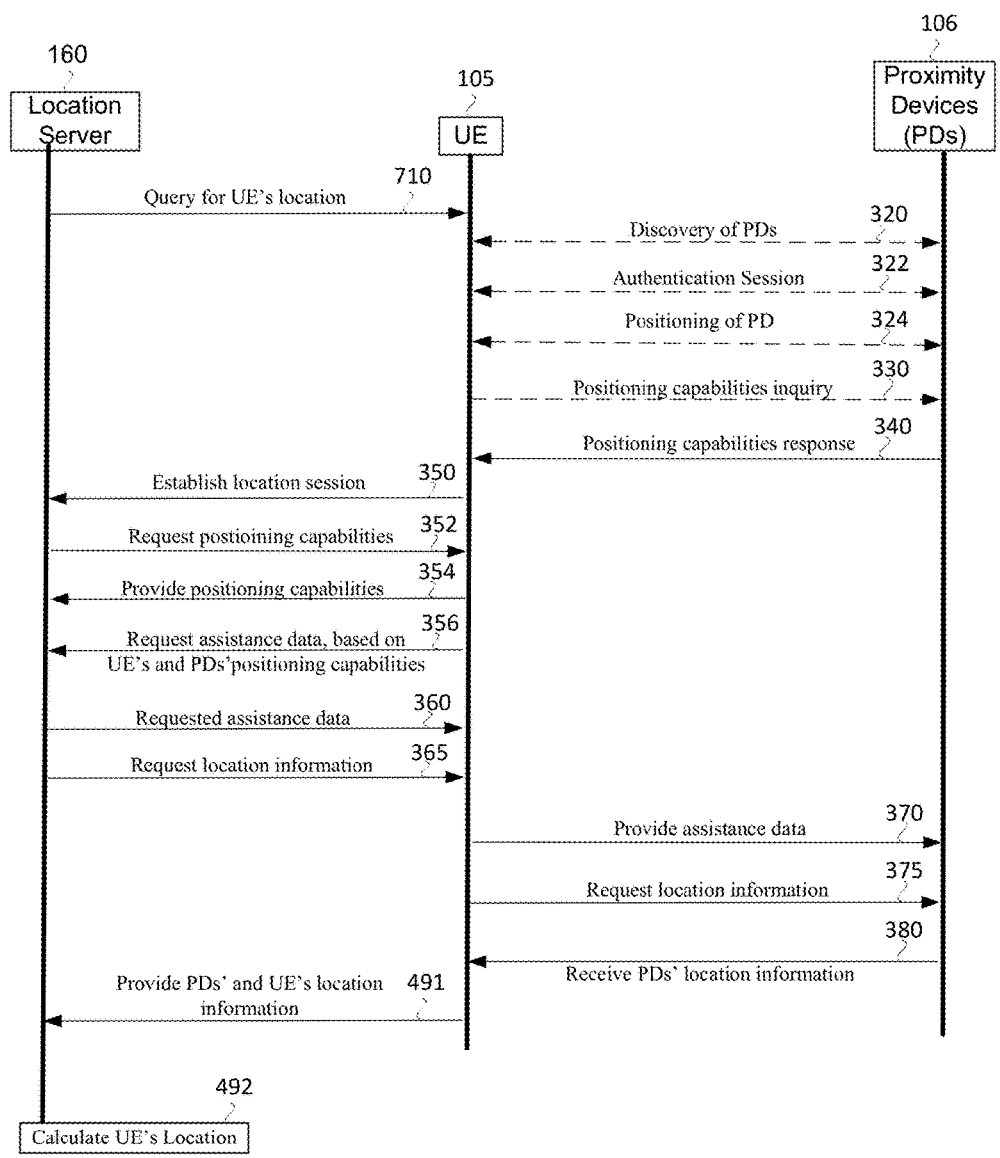

FIG. 6 illustrates an additional exemplary operation flow which, in conjunction with signaling flow diagrams of FIG. 7 and FIG. 8, illustrates a process flow 600 performed by the UE 105 for enabling location of the UE 105 by the location server(s) 160. Like numbered Actions in FIGS. 7 and 8 may be similar or identical to like numbered Actions in FIGS. 3 and 4. In an exemplary embodiment, the UE 105 is configured to perform the one or more blocks of the process flow 600. Particular means for performing the illustrated blocks can be performed by hardware and/or software components of the UE 105, such as the components illustrated in FIG. 10 and described in further detail below. Additionally, as with other figures provided herein, FIG. 6 is provided as an example. Other exemplary embodiments of the invention may perform similar methods in different manners, by, for example, adding, omitting, combining, separating, rearranging, and/or otherwise altering the blocks illustrated in FIG. 6. A person of ordinary skill in the art will recognize many variations.

Process flow 600 can begin at block 610 of FIG. 6, in which the UE 105 receives from the location server(s) 160, a request for a location of the UE 105, as also shown in Action 710 of FIGS. 7-8. The request received at block 610 may include quality of service (QoS) parameters indicating a requested type of location (e.g. civic or geodetic), a requested location accuracy and/or a requested response time.

In an exemplary embodiment, as shown in FIGS. 7-8, the UE 105 may then perform one or more of the following optional actions with the PD(s) 106, such as one or more of the PDs 106_a, 106_b or 106_c: (1) discover the PD(s) 106, such as PD 106_a, in communication with the UE 105 (Action 320); (2) establish an authentication session to authenticate, and/or enable authentication by, the discovered PD(s) 106 (Action 322); (3) obtain from, or be provided with, positioning information for the PD(s) 106 (Action 324) and/or (4) obtain positioning capabilities of the PD(s) 106 (Actions 330 and 340). Actions 320-340 may be the same as described previously in association with FIGS. 2-4.

Next, in block 620 of FIG. 6, the UE 105 sends to the location server(s) 160, a first message comprising first information for at least one PD 106 in communication with the UE 105 (e.g. due to one or more of Actions 320-340). Block 620 may comprise some or all of the actions described for block 220 of process flow 200. Thus, as previously described in conjunction with block 220 of FIG. 2, the first information may include: (i) a request for assistance data from the location server(s) 160, such as based on positioning capabilities of the UE 105 and the PD(s) 106 (e.g. as at Action 356 in FIGS. 7-8); or (ii) positioning capabilities of the PD(s) 106 and/or the UE 105 (e.g. as at Action 354 in FIGS. 7-8). In an exemplary embodiment, Action 356 may be preceded by some or all of the Actions 350-354 for FIGS. 7-8 and Action 354 may be preceded by some or all of the Actions 350-352 for FIGS. 7-8.

Next, in block 630 of FIG. 6, the UE 105 receives from the location server(s) 160, a second message comprising second information for the at least one PD 106. Block 630 may comprise some or all of the actions described for block 230 of process flow 200. Thus, as previously described in conjunction with block 230 of FIG. 2, the second information may include: (i) assistance data requested by the UE 105 for PD(s) 106 and possibly the UE 105 (e.g. requested in the first information) and as at Action 360 in FIGS. 7-8; (ii) assistance data supported by the PD(s) 106 and possibly by the UE 105 (e.g. according to positioning capabilities sent in the first information) and as at Action 360 in FIGS. 7-8; or (iii) a request for location information for PD(s) 106 and possibly the UE 105 (e.g. as at Action 365 in FIGS. 7-8).

Next, in block 640 of FIG. 6, the UE 105 sends to the at least one PD 106, the second information received at block 630. Block 640 may comprise some or all of the actions described for block 240 of process flow 200. Thus, when the second information includes assistance data supported by the PD(s) 106, the UE 105 sends the assistance data to the PD(s) 106 as also shown in Action 370 in FIGS. 7-8. When the second information includes a request for location information for the PD(s) 106, the UE 105 sends the request for location information to the PD(s) 106 as also shown in Action 375 in FIGS. 7-8.

Next, in block 650 of FIG. 6, the UE 105 receives from the at least one PD 106, a third information, which may include location information obtained by the PD(s) 106, as also shown in Action 380 of FIGS. 7-8. Block 650 may comprise some or all of the actions described for block 250 of process flow 200. Thus in one embodiment, the location information of the PD(s) 106 received in the third information is obtained or determined by the PD(s) 106 based on assistance data provided by the UE 105 to PD(s) 106, as at Action 370 in FIGS. 7-8. In another embodiment, the location information obtained by the PD(s) 106 and included in the third information may correspond to at least a portion (e.g. some or all) of location information requested by the UE 105 (e.g. at Action 375 in FIGS. 7-8), and possibly also based on assistance data provided by the UE 105, for example as at Action 370 in FIGS. 7-8. The location information included in the third information may include terrestrial measurements for BS(s) 120 and/or for AP(s) 130 (e.g. measurements of RSSI, RTT, S/N, TOA, AOA, RSRP, RSRQ and/or RSTD), SPS measurements for SPS(s) 110 (e.g. pseudo-range, code phase and/or carrier phase), measurements for sensors, location estimates for the PD(s) 106 and/or other measurements.

Next, in block 660 of FIG. 6, the UE 105 determines location information for UE 105 based on the received third information, such as based at least in part on the received location information for the PD(s) 106. Block 660 may include some of the actions described for block 260 of process flow 200. Thus, in an exemplary embodiment, as shown in Action 390 of FIG. 7, the UE 105 determines the location information by calculating a location of the UE 105 based on the third information, such as based at least in part on the received location information for the PD(s) 106. For example, the calculated location may be a geodetic or a civic location. In another embodiment, the UE 105 may not calculate a location but may instead determine the location information for the UE 105 by combining some or all of the location information received in the third information with other location information (e.g. terrestrial, SPS and/or sensor based measurements) obtained by UE 105. For example, the UE 105 may equate the location information for the UE 105 with the third information, such as when the UE 105 and the PD(s) 106 are sufficiently proximate to be considered as having practically the same location.

Next, in block 670 of FIG. 6, the UE 105 sends to the location server(s) 160 a third message comprising the determined location information for the UE 105. For example, in one embodiment, if the determined location information for the UE 105 comprises a calculated location for the UE 105 (e.g. as at Action 390 in FIG. 7), the UE 105 sends the calculated location for the UE 105 to location server(s) 160 in the third message as also shown in Action 790 of FIG. 7. In an alternative embodiment, if the determined location information for the UE 105 comprises some or all of the third information (e.g. if the determined location information is equated to the third information) and/or includes additional location information (e.g. location measurements) obtained by the UE 105, the UE 105 may send the determined location information to the location server(s) 160 as at Action 491 in FIG. 8. In this alternative embodiment, the location server(s) 160 may then calculate the UE 105 location based on the determined location information for the UE 105, as at Action 492 in FIG. 8.

Apparatus and means for performing the functionality of blocks 610, 640, 650, 660 in FIG. 6 and corresponding Action(s) 710, 320-340 and 370-390 in FIGS. 7-8 may comprise, for example, the processing unit(s) 1010, memory 1060, SPS receiver 1080 and antenna 1082, wireless communication interface 1030 and/or antenna 1032, as shown in FIG. 10 and described in further detail below. For example, processing unit(s) 1010 can be configured to cause the wireless communication interface 1030 to detect or discover, authenticate, and to request and receive positioning, and positioning capabilities of the PD(s) 106, as well as provide assistance data, and request and receive location information and/or positioning capabilities to and from the PD(s) 106.

Apparatus and means for performing the functionality of blocks 620, 630 and 670, and corresponding Action(s) 350-365, 491 and 790 may comprise, for example, the processing unit(s) 1010, memory 1060, SPS receiver 1080 and antenna 1082, wireless communication interface 1030 and/or antenna 1032, as shown in FIG. 10 and described in further detail below. For example, processing unit(s) 1010 can be configured to cause the wireless communication interface 1030 to establish a location session with the location server(s) 160, and to receive from a request for, and provide to, positioning capabilities of the PD(s) 106 and the UE 105, as well as request and/or receive assistance data and a request for location information, and to provide location information to the location server(s) 160.

Figure 9:
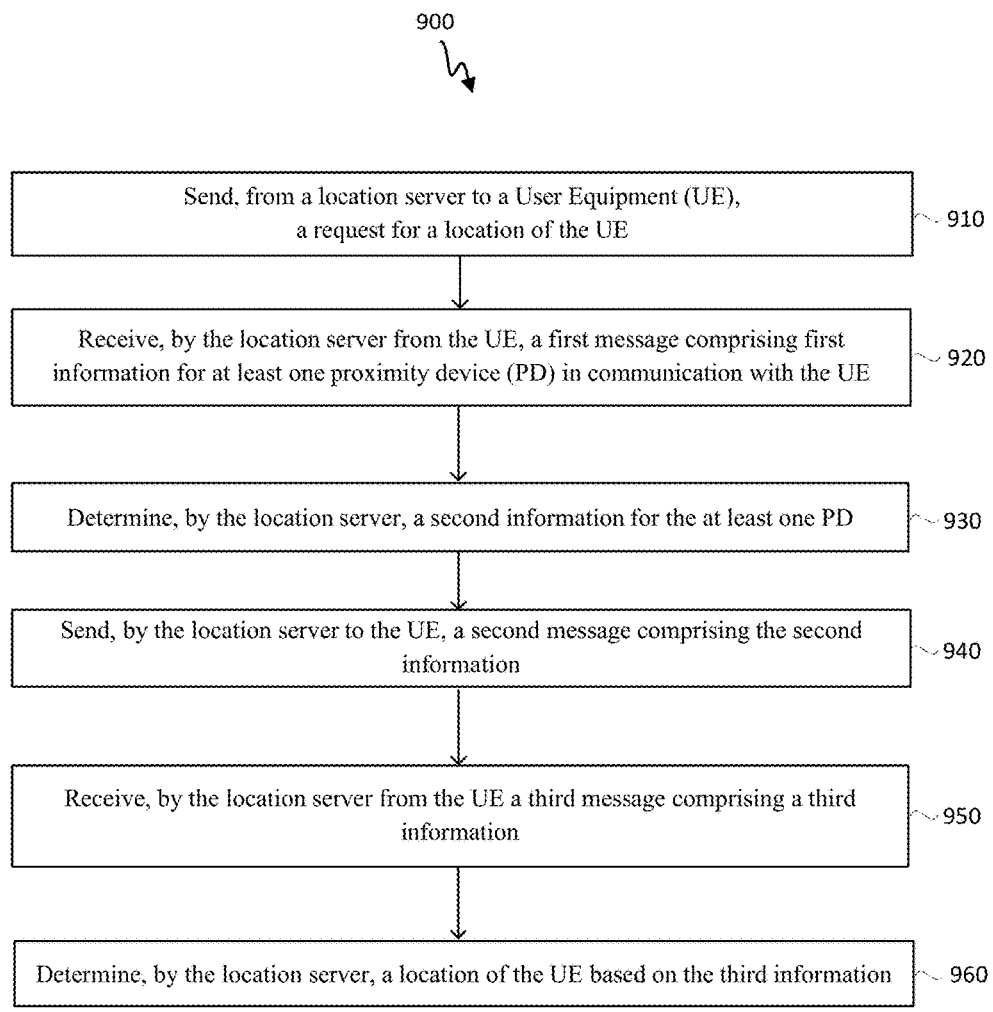

FIG. 9 illustrates an additional exemplary operation flow which, in conjunction with signaling flow diagrams of FIGS. 7 and 8, illustrates a process flow 900 performed by the location server(s) 160 for locating the UE 105 by the location server(s) 160.

Process flow 900 can begin at block 910 of FIG. 9, in which the location server 106 sends to the UE 105, a request for a location of the UE 105, as also shown in Action 710 of FIGS. 7-8. The request sent at block 910 may include quality of service (QoS) parameters indicating a requested type of location (e.g. civic or geodetic), a requested location accuracy and/or a requested response time.

Next, in block 920 of FIG. 9, the location server(s) 160 receives from the UE 105, a first message comprising first information for at least one PD 106 in communication with the UE 105. Block 920 may comprise some or all of the actions described for block 510 of process flow 500. Thus, as previously described in conjunction with block 510 of FIG. 5 and block 220 of FIG. 2, the first information may include a request for assistance data, such as based on positioning capabilities of the UE 105 and the PD(s) 106, as also shown in Action 356 of FIGS. 7-8. In an exemplary embodiment, Action 356 may have been preceded by some or all of the previously described Actions 320-354 of FIGS. 7-8. As previously described in conjunction with block 510 of FIG. 5 and block 220 of FIG. 2, the first information may instead comprise the positioning capabilities of the PD(s) 106 as well possibly as the positioning capabilities of the UE 105, as also shown in Action 354 of FIGS. 7-8. In an exemplary embodiment, Action 354 may have been preceded by some or all of the previously described Actions 320-352 of FIGS. 7-8.

Next, in block 930 of FIG. 9, the location server(s) 160 determines a second information for the at least one PD 106. Block 930 may comprise some or all of the actions described for block 520 of process flow 500. Thus, in an exemplary embodiment, the second information includes assistance data supported by the PD(s) 106 and possibly by the UE 105. In this embodiment, the assistance data may be determined by the location server(s) 160 based on a request for assistance data included in the first information received at block 920. For example, the assistance data determined in block 930 may correspond to a portion (e.g. some or all of) the assistance data requested in the first information. Alternatively in this embodiment, the assistance data may be determined by the location server(s) 160 based on positioning capabilities for the PD(s) 106 and the UE 105 received in the first information at block 920. For example, the assistance data determined in block 930 may correspond to a portion (e.g. some or all of) assistance data that is supported by PD(s) 106 and possibly the UE 105 according to positioning capabilities in the first information.

In another exemplary embodiment, the second information determined at block 930 includes a request for location information for the PD(s) 106 and/or for the UE 105. The location information that is determined to be requested at block 930 may be determined by the location server(s) 160 based on positioning capabilities for the PD(s) 106 and the UE 105 received in the first information at block 920. For example, the location information determined to be requested at block 930 may correspond to a portion (e.g. some or all of) the location information that is supported by PD(s) 106 and possibly the UE 105 according to the positioning capabilities in the first information.

Next, in block 940, the location server(s) 160 sends to the UE 105, a second message comprising the second information, such as assistance data supported by the PD(s) 106 and/or the UE 105, assistance data requested by the UE 105, or a request for location information for PD(s) 106 and the UE 105. Block 940 may comprise some or all of the actions described for block 530 of process flow 500. Thus, block 940 may correspond to Action 360 or Action 365 of FIGS. 7-8.

Next, in block 950 of FIG. 9, the location server(s) 160 receives from the UE 105 (e.g. in response to the sent second message) a third message comprising a third information. Block 950 may include some or all of the actions described for block 540 of process flow 500. Thus, in an exemplary embodiment, the third information includes location information for the PD(s) 106 and/or the UE 105, as shown in Action 491 of FIG. 8. In an exemplary embodiment, Action 491 may have been preceded by some or all of the previously described Actions 370-380 in FIG. 8 by which the third information is obtained by the UE 105. For example, location information included in the third information may have been obtained (e.g. measured) by the PD(s) 106 and/or by the UE 105 and may include terrestrial measurements for BS(s) 120 and/or for AP(s) 130, SPS measurements for SPS(s) 110, measurements for sensors, location estimates for the PD(s) 106 and/or other measurements. In an embodiment, the location information included in the third information may correspond to at least a portion (e.g. some or all) of location information requested by location server(s) 160 in the second information sent in the second message at block 940. In another embodiment, the third information comprises a location estimate for the UE 105 calculated by the UE 105 and sent to the location server(s) 160 as at Action 790 in FIG. 7. In an exemplary embodiment, Action 790 may have been preceded by some or all of the previously described Actions 370-390 in FIG. 7 by which the third information is obtained by the UE 105. For example, the UE 105 may calculate a location estimate for the UE 105 at Action 390 in FIG. 7 based on location measurements obtained by the UE 105 and/or location measurements obtained by PD(s) 106 and transferred to the UE 105 at Action 380 in FIG. 7.

Next, in block 960 of FIG. 9, the location server(s) 160 determines, such as by calculating, a location of the UE 105 based on the received third information. In one embodiment, if the third information comprises a location for the UE 105 calculated by the UE 105, such as received by location server(s) 160 at Action 790 in FIG. 7, the location server(s) 160 may determine the location of the UE 105 by equating the location to the location for the UE 105 received in the third information. In another embodiment, if the third information comprises location measurements (e.g. terrestrial, SPS and/or sensor based measurements) obtained by the UE 105 and/or PD(s) 106, such as received by location server(s) 160 at Action 491 in FIG. 8, the location server(s) 160 may calculate the location of the UE 105 from the location measurements received in the third information, as at Action 492 in FIG. 8. In determining a location of the UE 105 in block 960 as at Action 492 in FIG. 8, the location server(s) 160 may make use of known BSA data for BS(s) 120 and/or AP(s) 130, and/or known SV ephemeris, timing and other data for SPS(s) 110.

An apparatus and means for performing the functionality of blocks 910-960, and corresponding Action(s) 710, 790, 350-365, and 491-492 may comprise, for example, the processing unit(s) 1112, memory storage devices 1125, Communication Subsystem 1130 which includes wireless communication interface 1133, as shown in FIG. 11 and described in further detail below. For example, processing unit(s) 1112 can be configured to cause the wireless communication interface 1133 to (i) establish a location session with the UE 105, (ii) receive from the UE 105 the positioning capabilities of the PD(s) 106 and/or the UE 105 or a request for assistance data, (iii) provide assistance data to the UE 105, (iv) receive a location estimate or location measurements from the UE 105, and/or (v) calculate a location for the UE 105 based on location measurements received from the UE 105.

In some embodiments, certain messages in process flows 200, 500, 600 and/or 900 may be messages for the LTE Positioning Protocol (LPP) defined by 3GPP in 3GPP TS 36.355, messages for the LPP Extensions (LPPe) protocol defined by OMA in OMA TS OMA-TS-LPPe-V1_0, OMA TS OMA-TS-LPPe-V1_1 and OMA TS OMA-TS-LPPe-V2_0 or messages for LPP used in combination with LPPe (referred to as LPP/LPPe). For example, in process flow 200 (e.g. at bock 220), process flow 500 (e.g. at block 510), process flow 600 (e.g. at block 620) and process flow 900 (e.g. at block 920), the first message may be an LPP or LPP/LPPe Request Assistance Data message (e.g. if UE 105 is requesting assistance data for PD(s) 106) or an LPP or LPP/LPPe Provide Capabilities message (e.g. if the UE 105 is providing the positioning capabilities of PD(s) 106). Similarly, in process flow 200 (e.g. at bock 230), process flow 500 (e.g. at block 530), process flow 600 (e.g. at block 630) and process flow 900 (e.g. at block 940), the second message may be an LPP or LPP/LPPe Provide Assistance Data message (e.g. if location server(s) 160 is providing assistance data for the PD(s) 106) or an LPP or LPP/LPPe Request Location Information message (e.g. if location server(s) 160 is requesting a location or location information for the PD(s) 106 and/or for the UE 105). Further, in process flow 500 (e.g. at block 540), process flow 600 (e.g. at block 670) and process flow 900 (e.g. at block 950), the third message may be an LPP or LPP/LPPe Provide Location Information message (e.g. if UE 105 is providing a calculated location for the UE 105 or location measurements obtained by PD(s) 106) and possibly by the UE 105 to location server(s) 160). Sending of LPP or LPP/LPPe messages between the UE 105 and location server(s) 160 as in the previously mentioned examples may be applicable when location server(s) 160 or the UE 105 establish one or more control plane location sessions or one or more user plane location sessions between location server(s) 160 and the UE 105—e.g. as at Action 350 in the signaling flows in FIGS. 3, 4, 7 and 8. For example, when a user plane location session (or sessions) is established according to the OMA SUPL solution, an LPP or LPP/LPPe message may be transferred between location(s) 160 and the UE 105 embedded inside a SUPL POS or a SUPL POI INIT message. Similarly, when a 3GPP control plane location session (or sessions) is established, an LPP or LPP/LPPe message may be transferred between location server(s) 160 and the UE 105 embedded inside 3GPP signaling messages such as messages for the Non-Access-Stratum (NAS) protocol defined in 3GPP TS 24.301 or the LCS Application Protocol (LCS-AP) defined in 3GPP TS 29.171.

In some embodiments, certain Actions shown in the signaling flows exemplified by FIGS. 3, 4, 7, 8 may occur in a different order to that shown and/or may be omitted. For example, Actions 320-340 in FIGS. 3, 4, 7, 8 may occur in a different order to that shown and/or may occur before Action 310 in FIGS. 3 and 4, before Action 710 in FIGS. 7 and 8 or after Action 350 in FIGS. 3, 4, 7 and 8. As another example, Action 324 may be omitted in FIGS. 3, 4, 7 and 8—e.g. if the UE 105 communicates with PD(s) using a short range wireless technology such as Bluetooth Low Energy or Near Field Communication, where it may be assumed that the UE 105 and PD(s) 106 share almost the same location.

FIG. 10 illustrates an exemplary embodiment of a wireless device 1000, which can be utilized as described herein above. The wireless device 1000 may correspond to or be representative of the UE 105 or a PD 106. For example, when corresponding to the UE 105 or a PD 106, the wireless device 1000 can be used in the positioning system 100 of FIG. 1 to perform positioning related functions as described in relation to FIGS. 2-9. When corresponding to the UE 105, the wireless device 1000 may also support data and/or voice related services for a user. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations.

The wireless device 1000 is shown comprising hardware elements that can be electrically coupled via a bus 1005 (or may otherwise be in communication, as appropriate). The hardware elements may include a processing unit(s) 1010 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 10, some exemplary embodiments may have a separate Digital Signal Processor (DSP) 1020, depending on desired functionality. The wireless device 1000 also may comprise one or more input devices 1070, which may comprise without limitation one or more touch screens, touch pads, microphones, buttons, dials, switches, and/or the like; and one or more output devices 1015, which may comprise without limitation, one or more displays, light emitting diodes (LEDs), speakers, and/or the like.

The wireless device 1000 may also include a wireless communication interface 1030, which may comprise without limitation a modem, a network card, an infrared communication device, a wireless communication device, and/or a chipset (such as a Bluetooth device, an IEEE 802.11 Wi-Fi device, an IEEE 802.15.4 device, a WiMAX device, cellular communication facilities, etc.), and/or the like. The wireless communication interface 1030 may permit voice, signaling and data to be communicated with a network, wireless access points, other computer systems, other wireless devices (e.g. the UE 105 or the PD(s) 106), and/or any other electronic devices described herein, such as the Network(s) 170 or location server(s) 160, described in relation to FIG. 1. The communication can be carried out via one or more wireless communication antenna(s) 1032 that send and/or receive wireless signals 1034. It should be noted that the messages or information communications between the UE 105, the location server(s) 160 and the PD(s) 106 as described herein may be based on Long Term Evolution (LTE) Positioning Protocol (LPP), a LPP Extensions (LPPe) protocol, or a combination thereof. Further, the message or information communication between the UE 105 and the PD(s) 106 as described herein may be based on LTE Direct, Wi-Fi Direct or Bluetooth signaling.

Depending on desired functionality, the wireless communication interface 1030 may comprise separate transceivers to communicate with base station(s) 120, AP(s) 130 and other wireless devices and access points in Network(s) 170. As indicated previously with respect to FIG. 1, Network(s) 170 may comprise various network types. For example, a Network 170 comprising a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Network 170 that comprises a WLAN or a Wireless Personal Area Network (WPAN) may be an IEEE 802.11x network, a Bluetooth network, an IEEE 802.15x, or some other type of network. The techniques described herein may also be used for any combination of Network(s) 170 that act as a WWAN, WLAN and/or WPAN.

The wireless device 1000 can further include sensor(s) 1040. Such sensors may comprise, without limitation, one or more accelerometer(s), gyroscope(s), camera(s), magnetometer(s), altimeter(s), microphone(s), proximity sensor(s), light sensor(s), barometer(s), and the like. Some or all of the sensor(s) 1040 can be utilized, among other things, for dead reckoning and/or other positioning methods. Such positioning methods may be used to determine a location of wireless device 1000, which can be used and provided as part of the information detailed herein.

Embodiments of the wireless device 1000 may also include an SPS receiver 1080 capable of receiving signals 1084 from one or more SPS satellites (such as satellites for SPS(s) 110 of FIG. 1) using an SPS antenna 1082 (which may be the same antenna as wireless communication antenna(s) 1032). Such positioning can be utilized to complement and/or incorporate the techniques described herein. The SPS receiver 1080 may obtain SPS location measurements for the wireless device 1000 (e.g. pseudo-range or code (phase measurements), using conventional techniques, from SPS SVs of an SPS system, such as a GNSS such as the Global Positioning System (GPS), Galileo, GLONASS, Beidou, or a regional SPS such as the Quasi-Zenith Satellite System (QZSS) over Japan, the Indian Regional Navigational Satellite System (IRNSS) over India, and/or the like. Moreover, the SPS receiver 1080 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. In some embodiments of wireless device 1000, SPS Receiver 1080 and/or Processing Unit(s) 1010 may further be configured or programmed to calculate a location of wireless device 1000 from SPS location measurements obtained by SPS Receiver 1080.

The wireless device 1000 may further include and/or be in communication with a memory 1060. The memory 1060 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1060 of the wireless device 1000 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by wireless device 1000 (and/or a processing unit within the wireless device 1000, and/or another device of a positioning system). In an aspect, then, such code and/or instructions can be used to configure and/or adapt a general purpose computer (or other device) to perform one or more operations in accordance with the described methods.

FIG. 11 illustrates an embodiment of a computer system 1100, which may be incorporated, at least in part, into devices such as the one or more UE 105, the PD(s) 106, or location server(s) 160 as described in FIGS. 1-9, and/or a computing device incorporated and/or communicatively connected therewith, as described herein. FIG. 11 provides a schematic illustration of one exemplary embodiment of a computer system 1100 that can perform the methods provided by various other embodiments, such as the methods described in relation to FIGS. 2-9. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical locations.

The computer system 1100 is shown comprising hardware elements that can be electrically coupled via a bus 1105 (or may otherwise be in communication, as appropriate). The hardware elements may include processing unit(s) 1112, which may comprise without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 1-9. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 may also include a communications subsystem 1130, which may comprise wireless communication technologies managed and controlled by a wireless communication interface 1133, as well as wired technologies. The communications subsystem 1130 may comprise a modem, a network card (wireless or wired), an infrared communication device, a wireless communication device, and/or a chipset (such as a Bluetooth device, an IEEE 802.11 Wi-Fi device, an IEEE 802.15.4 device, a WiMAX device, cellular communication facilities, UWB interface, etc.), and/or the like. The communications subsystem 1030 may include one or more input and/or output communication interfaces, such as the wireless communication interface 1133, to permit signaling, voice and/or data to be exchanged with a network, mobile devices (such as the UE 105 or PD(s) 106 of FIG. 1), other computer systems, and/or any other electronic devices described herein. Hence, the communications subsystem 1130 may be used to receive and send data (e.g., location information, etc.) as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Software elements may further comprise data, such as venue maps(s) 1150, utilized by applications(s) 1145, which may be retrieved from storage device(s) 1125 and/or the communications subsystem 1130 as needed by the applications(s) 1145. Merely by way of example, one or more procedures described with respect to the method(s) discussed above, such as the methods described in relation to FIGS. 2-9, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for locating a User Equipment (UE) comprising:
    initiating, by the UE, a request for a location of the UE;
    sending, by the UE to a location server, a first message comprising a first information regarding at least one proximity device (PD) in communication with the UE;
    receiving, by the UE from the location server, a second message comprising a second information for the at least one PD, wherein the second information comprises assistance data supported by the at least one PD and enabling the at least one PD to determine its location;
    sending, by the UE to the at least one PD, the second information;
    in response to sending the second information, receiving, by the UE from the at least one PD, a third information comprising location information regarding the at least one PD; and
    obtaining, by the UE, the location of the UE based on the third information.

2. The method of claim 1, wherein the first information comprises a request for the assistance data from the location server.

3. The method of claim 1, wherein the first information comprises positioning capabilities of the at least one PD, the positioning capabilities comprising a capability of the at least one PD to use the assistance data.

4. The method of claim 1, wherein the location information regarding the at least one PD is based on the assistance data.

5. The method of claim 1, wherein obtaining the location of the UE comprises:
    sending a third message to the location server, the third message comprising the third information; and
    receiving a fourth message from the location server, the fourth message comprising the location of the UE.

6. The method of claim 1, wherein obtaining the location of the UE comprises:
    calculating, by the UE, the location of the UE based on the third information.

7. The method of claim 1, further comprising:
    initiating a location session with the location server, the initiating the location session occurring prior to or in combination with sending the first message.

8. The method of claim 1, further comprising:
    discovering the at least one PD; and
    authenticating the at least one PD.

9. The method of claim 1, further comprising:
obtaining location information for the at least one PD, the obtaining the location of the UE being based at least in part on the location information for the at least one PD.

10. The method of claim 9, wherein the location information for the at least one PD comprises a range to the at least one PD, an angle of arrival for the at least one PD, or a location estimate for the at least one PD, or combination thereof.

11. The method of claim 1, wherein the first information is received from the at least one PD.

12. The method of claim 1, wherein the first message and the second message each comprise a Long Term Evolution (LTE) Positioning Protocol (LPP) message or a LPP Extensions (LPPe) protocol message.

13. A user equipment (UE) comprising:
a wireless communication interface;
a memory; and
a processing unit communicatively coupled with the wireless communication interface and the memory, the processing unit configured to cause the UE to:
initiate a request for a location of the UE;
send to a location server, a first message comprising a first information regarding at least one proximity device (PD) in communication with the UE;
receive from the location server, a second message comprising a second information for the at least one PD, wherein the second information
comprises assistance data supported by the at least one PD and enabling the at least one PD to determine its location;
send to the at least one PD, the second information;
receive from the at least one PD and in response to sending the second information, a third information comprising location information regarding the at least one PD; and
obtain the location of the UE based on the third information.

14. The UE of claim 13, wherein the location information regarding the at least one PD is based on the assistance data.

15. The UE of claim 14, wherein the first information comprises a request for the assistance data from the location server, or positioning capabilities of the at least one PD, or any combination thereof, the positioning capabilities comprising a capability of the at least one PD to use the assistance data.

16. The UE of claim 13, wherein to obtain the location of the UE the processing unit is further configured to cause the UE to:
send a third message to the location server, the third message comprising the third information; and
receive a fourth message from the location server, the fourth message comprising the location of the UE.

17. The UE of claim 13, wherein to obtain the location of the UE the processing unit is further configured to cause the UE to calculate the location of the UE based on the third information.

18. The UE of claim 13, the processing unit is further configured to cause the UE to:
discover the at least one PD; and
authenticate the at least one PD.

19. The UE of claim 13, wherein the processing unit is further configured to cause the UE to:
obtain location information for the at least one PD, the obtaining the location of the UE being based at least in part on the location information for the at least one PD.

20. The UE of claim 19, wherein the location information for the at least one PD comprises a range to the at least one PD, an angle of arrival for the at least one PD, or a location estimate for the at least one PD, or combination thereof.

21. A method comprising:
receiving, at a location server from a User Equipment (UE), a first message comprising a first information regarding at least one proximity device (PD) in communication with the UE;
determining, by the location server, a second information regarding the at least one PD;
sending, by the location server to the UE, a second message comprising the second information, wherein the second information
comprises assistance data supported by the at least one PD and enabling the at least one PD to determine its location;
receiving, by the location server from the UE in response to the sent second message, a third message comprising a third information;
determining, by the location server, a location of the UE based on the third information comprising location information regarding the at least one PD; and
sending, by the location server to the UE, the determined location of the UE.

22. A location server comprising:
a wireless communication interface;
a memory; and
a processing unit communicatively coupled with the wireless communication interface and the memory, the processing unit configured to cause the location server to:
receive, at the location server from a User Equipment (UE), a first message comprising a first information regarding at least one proximity device (PD) in communication with the UE;
determine, by the location server, a second information for the at least one PD;
send, by the location server to the UE, a second message comprising the second information, wherein the second information
comprises assistance data supported by the at least one PD and enabling the at least one PD to determine its location;
receive, by the location server from the UE in response to the sent second message, a third message comprising a third information;
determine, by the location server, a location of the UE based on the third information comprising location information regarding the at least one PD; and
send, by the location server to the UE, the determined location of the UE.

* * * * *